US010382765B2

(12) United States Patent
Francois et al.

(10) Patent No.: US 10,382,765 B2
(45) Date of Patent: Aug. 13, 2019

(54) METHOD AND DEVICE FOR ENCODING OR DECODING AND IMAGE

(71) Applicant: CANON KABUSHIKI KAISHA, Tokyo (JP)

(72) Inventors: Edouard Francois, Bourg des Comptes (FR); Guillaume Laroche, Melesse (FR); Patrice Onno, Rennes (FR); Christophe Gisquet, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 682 days.

(21) Appl. No.: 14/411,259

(22) PCT Filed: Jun. 28, 2013

(86) PCT No.: PCT/EP2013/063730
§ 371 (c)(1),
(2) Date: Dec. 24, 2014

(87) PCT Pub. No.: WO2014/001547
PCT Pub. Date: Jan. 3, 2014

(65) Prior Publication Data
US 2015/0326863 A1    Nov. 12, 2015

(30) Foreign Application Priority Data

Jun. 29, 2012    (GB) .................................. 1211624.0

(51) Int. Cl.
*H04N 19/176*    (2014.01)
*H04N 19/157*    (2014.01)
(Continued)

(52) U.S. Cl.
CPC ........... *H04N 19/157* (2014.11); *H04N 19/12* (2014.11); *H04N 19/176* (2014.11); *H04N 19/186* (2014.11); *H04N 19/46* (2014.11)

(58) Field of Classification Search
CPC .................................................... H04N 19/176
See application file for complete search history.

(56) References Cited

U.S. PATENT DOCUMENTS

2009/0003717 A1*    1/2009    Sekiguchi ............ H04N 19/176
                                                  382/238
2009/0003731 A1    1/2009    Nitta et al.
2013/0272401 A1*    10/2013    Seregin ............ H04N 19/00533
                                                  375/240.12

FOREIGN PATENT DOCUMENTS

CN    1846437 A    10/2006
GB    2492333 A    1/2013
WO    2012/087077 A2    6/2012

OTHER PUBLICATIONS

Mrak et al., "Improving Screen Content Coding in HEVC by Transform Skipping", 20th European Signal Processing Conference (EUSIPCO 2012), Bucharest, Romania, Aug. 27-31, 2012, pp. 1209-1213, ISBN: 978-1-46731068-0.

(Continued)

*Primary Examiner* — Dave Czekaj
*Assistant Examiner* — Berteau Joisil
(74) *Attorney, Agent, or Firm* — Canon U.S.A., Inc. I.P. Division

(57) ABSTRACT

A video signal has at least a first signal component corresponding to a first color, and a second signal component, associated with the first signal component and corresponding to a second color. Each signal component is divided into blocks, and each block has one or more encodable units. The encoding of at least one encodable unit of the second signal component is switchable between first and second modes. A method of encoding the signal comprises excluding, for at least one encodable unit of the second signal component, use of the second mode for the encoding of the second-signal-component encodable unit concerned when at least one (Continued)

predetermined condition is satisfied relating to an encoded block or encodable unit of the first signal component that corresponds to the second-signal-component encodable unit concerned.

44 Claims, 15 Drawing Sheets

(51) Int. Cl.
*H04N 19/12* (2014.01)
*H04N 19/186* (2014.01)
*H04N 19/46* (2014.01)

(56) References Cited

OTHER PUBLICATIONS

Zhu et al., "Non Transform Mode for Inter Coding", Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, pp. 1-4.

Lan et al., "Intra transform skipping", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, pp. 1-6.

Van Der Auwera et al., "Intra Transform Skipping: Smallest CU and Implicit Chroma", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, pp. 1-12.

Onno et al., "Combination of J0171 and J0389 for the non-normative encoder selection of the Intra Transform Skip", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, pp. 1-4.

Sullivan et al., "Overview of the High Efficiency Video Coding (HEVC) Standard", IEEE Transactions on Circuits and Systems for Video Technology, Dec. 2012, pp. 1649-1668, vol. 22, No. 12.

Mrak, et al., "Transform skip mode", Joint Collaborative Team on Video Coding (JCT-VC) of ITU-T SG16 WP3 and ISO/IEC, JTC1/SC291WG11, 6th Meeting: Torino, IT, Jul. 14-22, 2011.

Wallendael, et al., "Transform skipping dependant on block parameters", Joint Collaborative Team on Video Coding (JCT-VC) of ITU-T SG16 WP3 and ISO/IEC JTC1/SC29/WG11, 7th Meeting: Geneva, CH, Nov. 21-30, 2011.

\* cited by examiner

METHOD AND DEVICE FOR ENCODING OR DECODING AND IMAGE

CROSS-REFERENCE TO RELATED APPLICATIONS

This application is the National Phase application of PCT Application No. PCT/EP2013/063730, filed on Jun. 28, 2013 and titled "Method and device for encoding or decoding an image". This application claims the benefit under 35 U.S.C. § 119(a)-(d) of United Kingdom Patent Application No. 1211624.0, filed on Jun. 29, 2012 and titled "Method and device for encoding or decoding an image", which application is incorporated herein by reference in its entirety.

FIELD OF THE INVENTION

The invention relates to a method and a device for encoding or decoding an image. Particularly, but not exclusively the invention relates more specifically to coding of image portions of an image in accordance with the High Efficiency Video Coding (HEVC) standard under development.

BACKGROUND OF THE INVENTION

Video applications are continuously moving towards higher resolution. A large quantity of video material is distributed in digital form over broadcast channels, digital networks and packaged media, with a continuous evolution towards higher quality and resolution (e.g. higher number of pixels per frame, higher frame rate, higher bit-depth or extended color gamut). This technology evolution puts higher pressure on the distribution networks that are already facing difficulties in bringing HDTV resolution and high data rates economically to the end user. Consequently, any further data rate increases will put additional pressure on the networks.

To handle this challenge, ITU-T and ISO/MPEG decided to launch in January 2010 a new video coding standard project, named High Efficiency Video Coding (HEVC).

The HEVC codec design is similar to that of previous so-called block-based hybrid transform codecs such as H.263, H.264, MPEG-1, MPEG-2, MPEG-4 or SVC. Video compression algorithms such as those standardized by standardization bodies ITU, ISO and SMPTE use the spatial and temporal redundancies of the images in order to generate data bit streams of reduced size compared with the video sequences. Such compression techniques render the transmission and/or storage of the video sequences more effective.

An original video sequence to be encoded or decoded generally comprises a succession of digital images as illustrated in FIG. 1.

FIG. 1 shows the coding structure used in HEVC. According to HEVC and one of its previous predecessors, the original video sequence 101 is a succession of digital images "images i". As known per se, a digital image is represented by one or more matrices the coefficients of which represent pixels.

The images 102 are divided into slices 103. A slice is a part of the image or the entire image. In HEVC these slices are divided into non-overlapping Largest Coding Units (LCUs), also called Coding Tree Blocks (CTB) 104, generally blocks of size 64 pixels×64 pixels. Each CTB may in its turn be iteratively divided into smaller variable size Coding Units (CUs) 105 using a quadtree decomposition. Coding units are the elementary coding elements and are constituted of two sub units which are Prediction Unit (PU) and Transform Units (TU) of maximum size equal to the CU's size. A Prediction Unit corresponds to the partition of the CU for prediction of pixel values. Each CU can be further partitioned into a maximum of 4 Partition Units 106. Transform units are used to represent the elementary units that are spatially transformed with a Transform (which can be for instance the Direct Cosine Transform also known as DCT). A CU can be partitioned into TUs based on a quadtree representation (107).

Each slice is embedded in one Network Abstration Layer (NAL) unit. In addition, the coding parameters of the video sequence are stored in dedicated NAL units called parameter sets. In HEVC two kinds of parameter sets NAL units are employed: first, the Sequence Parameter Set (SPS) NAL unit that gathers all parameters that are unchanged during the whole video sequence, and second, Picture Parameter Sets (PPS) which code the different values that may change from one frame to another. HEVC includes also Adaptation Parameter Sets (APS) which contain parameters that may change from one slice to another.

Each image may be made up of one or more image components, also called color components or channels. The color components are sets of two-dimensional arrays of sample values, each entry of which represents the intensity of a color component such as a measure of luma brightness and chroma color deviations from neutral grayscale color toward blue or red (YUV) or as a measure of red, green, or blue light component intensity (RGB). A YUV model generally defines a color space in terms of one luma (Y) and two chrominance (UV) components. Generally Y stands for the luma component (the brightness) and U and V are the chrominance (color) or chroma components. A 4:2:0 YUV image, for example, is made up of one luma component plus two chroma components having a quarter of the spatial resolution (half width and half height) of the luma component.

The coding and decoding devices comprise several means able to carry out a coding/decoding step as respectively illustrated in the FIGS. 2 and 3.

FIG. 2 shows a diagram of a classical HEVC video encoder 20 that can be considered as a superset of one of its predecessors (H.264/AVC).

Each frame of the original video sequence 101 is first divided into a grid of coding units (CU) by the module 201. This module controls also the definition of slices.

The subdivision of the LCU into CUs and the partitioning of the CU into TUs and PUs are determined according to a rate distortion criterion. Each PU of the CU being processed is predicted spatially by an "Intra" predictor 217, or temporally by an "Inter" predictor 218. Each predictor is a block of pixels issued from the same image or another image, from which a difference block (or "residual") is derived. Thanks to the identification of the predictor block and the coding of the residual, it is possible to reduce the quantity of information actually to be encoded.

The encoded frames are of two types: temporal predicted frames (either predicted from one reference frame called P-frames or predicted from two reference frames called B-frames) and non-temporal predicted frames (called Intra frames or I-frames). In I-frames, only Intra prediction is considered for coding CUs/PUs. In P-frames and B-frames, Intra and Inter prediction are considered for coding CUs/PUs.

In the "Intra" prediction processing module 217, the current block is predicted by means of an "Intra" predictor, a block of pixels constructed from the information already encoded of the current image. The module 202 determines a prediction mode that is used to predict pixels from the neighbors PUs pixels. In HEVC, up to 35 directions are considered. A residual block is obtained by computing the difference of the intra predicted block and current block of pixel. An intra-predicted block is therefore composed of a prediction mode with a residual. The intra prediction mode is coded in a module 203.

With regard to the second processing module 218 that is used for "Inter" coding, two prediction types are possible. Mono-prediction (P-type) consists of predicting the block by referring to one reference block from one reference picture. Bi-prediction (B-type) consists in predicting the block by referring to two reference blocks from one or two reference pictures. An estimation of motion between the current PU and reference images 215 is made by a module 204. One of its goals is to identify, in one or several of these reference images 215, one (P-type) or several (B-type) blocks of pixels to use as predictors of this current block.

The reference block is identified in the reference frame by a motion vector relating the PU in the current frame to its reference block (or prediction block). A following stage of inter prediction process is implemented by a module 205. It consists in computing the difference between the prediction block and current block. This block of difference is the residual of the inter-predicted block. At the end of the inter prediction process the current PU is composed of one motion vector and a residual.

Finally, current PU's motion vector is coded by a module 206. These two types of coding (inter or intra) thus supply several texture residuals (the difference between the current block and the predictor block), which are compared in a module 216 for selecting the best coding mode.

The residual obtained at the end of the inter or intra prediction process is then transformed by a transform module 207. The transform applies to a Transform Unit (TU) that is included in a CU. A TU can be further split into smaller TUs using a so-called Residual QuadTree (RQT) decomposition realized by the module 206. In HEVC, generally 2 or 3 levels of decompositions are used and authorized transform sizes are from 32×32, 16×16, 8×8 and 4×4. The transform basis is derived from a discrete cosine transform DCT.

The residual transformed coefficients are then quantized by a quantization module 208. The coefficients of the quantized transformed residual are then coded by an entropy coding module 209 and then inserted in a compressed bit stream 210. Coding syntax elements are also coded with help of the module 209. This processing module uses spatial dependencies between syntax elements to increase the coding efficiency.

In order to calculate the "Intra" predictors or to make an estimation of the motion for the "Inter" predictors, the encoder performs a decoding of the blocks already encoded by modules of a so-called "decoding" loop (211, 212, 213, 214, 215). This decoding loop makes it possible to reconstruct the blocks and images from the quantized transformed residuals.

Thus the quantized transformed residual is dequantized by a dequantization module 211 by applying the inverse quantization to that provided by the module 208. An inverse transform module 212 is able to reconstruct the block by applying the inverse transform regarding the transform realized by the module 207.

If the residual comes from the "Intra" coding module 217, the used "Intra" predictor is added to this residual in order to recover a reconstructed block corresponding to the original block modified by the losses resulting from a transformation with loss, here quantization operations.

If the residual on the other hand comes from the "Inter" coding module 218, the blocks pointed to by the current motion vectors (these blocks belong to the reference images 215 referred by the current image indices) are merged then added to this decoded residual. In this way the original block is modified by the losses resulting from the quantization operations.

A final loop filter 219 is applied to the reconstructed signal in order to reduce the effects created by heavy quantization of the residuals obtained and to improve the signal quality. In the current HEVC standard, 3 types of loop filters are used: a deblocking filter 213, a sample adaptive offset (SAO) 220 and an adaptive loop filter (ALF) 214.

The filtered images, also called reconstructed images, are then stored as reference images 215 in order to allow the subsequent "Inter" predictions taking place during the compression of the following images of the current video sequence.

A corresponding decoder 30 is represented in the FIG. 3. More precisely, the FIG. 3 shows a block diagram of a video decoder 30 of HEVC type. The decoder 30 receives as an input a bitstream 210 corresponding to a video sequence 101 compressed by an encoder of the HEVC type, like the one in FIG. 2.

During the decoding process, the bitstream 210 is first of all parsed with help of an entropy decoding module 301. This processing module 301 uses the previously entropy decoded elements to decode the encoded data. It decodes in particular the parameter sets of the video sequence to initialize the decoder 30 and also decodes the LCU of each video frame. Each NAL unit that corresponds to slices is then decoded.

The partition of the LCU is parsed and CU, PU and TU subdivisions are identified. The decoder 30 successively processes each CU using intra 307 and inter 306 processing modules, inverse quantization and inverse transform modules and finally loop filter 219 (which have the same structure as the loop filter in the encoder 20).

The "Inter" or "Intra" prediction mode for the current block is parsed from the bitstream 210 with help of the parsing process module 301. Depending on the prediction mode, either intra prediction processing module 307 or inter prediction processing module 306 is employed. If the prediction mode of the current block is "Intra" type, the prediction mode is extracted from the bit stream and decoded with help of neighbors' prediction mode during stage 304 of intra prediction processing module 307. The intra predicted block is then computed by the module 303 with the decoded prediction mode and the already decoded pixels at the boundaries of current PU. The residual associated with the current block is recovered from the bit stream 301 and then entropy decoded.

If the prediction mode of the current block indicates that this block is of "Inter" type, the motion information is extracted from the bitstream 210 and decoded by the module 304. This motion information is used in the reverse motion compensation module 305 in order to determine the "Inter" predictor block contained in the reference images 215 of the decoder 30. In a similar manner to the encoder, these reference images 215 are composed of images that precede the image currently being decoded and that are reconstructed from the bitstream (and therefore decoded previously).

In order to decode the residual block that has been transmitted in the bitstream, the parsing module 301 is also able to extract the residual coefficients from the bitstream 210. The modules 211 and 212 are respectively able to perform the inverse quantization and an inverse transform to obtain a residual block. This residual block is added to the predicted block, obtained at output of the intra or inter processing modules 306 and 307.

At the end of the decoding of all the blocks of the current image, the loop filter 219 is used to eliminate the block effects and improve the signal quality in order to obtain the reference images 215. As done at the encoder, this processing module employs the deblocking filter 213, then SAO 220 filter and finally the ALF 214 (not shown within the loop filter 219 in FIG. 3).

The images thus decoded by the decoder 30 constitute the output video signal 308 of the decoder, which can then be displayed and used.

More specifically, one embodiment of the invention relates to a specific coding mode, named "Transform Skip", specified in the HEVC standard. In HEVC, there is an option allowing skipping the transform step (realized by the module 207 in the FIG. 2) and inverse transforming step (realized by the module 212 in the FIG. 3). The Transform Skip mode has been proposed to the HEVC standardization group in documents JCTVC-H0361 and JCTVC-I0408. It has been adopted in HM7 (JCTVC-I1003) in May 2012.

This mode involves skipping the transform process, which is replaced by a scaling process to keep a similar signal range as when transform applies. The skip can be allowed for certain color components blocks, for example luma or chroma component intra blocks.

More precisely, in its current design (named "HM7"), only luma or chroma blocks resulting from intra prediction and having a 4*4 size are allowed to support Transform Skip mode. However, the Transform Skip mode is not limited to this design.

To enable this mode for such blocks, first a high-level flag, placed in the SPS, is used to enable or disable the Transform Skip mode for the images of the sequence. In addition, another flag is inserted in the syntax of the prediction residual signal decoding of 4×4 blocks, to signal if the Transform Skip mode applies or not to the block. To enable this mode for a given 4×4 block, the two flags must be set to true.

FIG. 4a depicts more in detail a part of an HEVC decoder to explain operations 401 when the decoder is in Normal mode (also called first mode), that is, when Transform Skip mode (also called second mode) does not apply to a given block. The decoded coefficients coming from the entropy decoding module 301 are processed by the inverse quantization module 211 and then by the inverse transform module 212. The resulting signal, which corresponds to the prediction residual samples, is added to the intra prediction signal coming from the intra prediction module 303. The resulting signal 308 corresponds to the reconstructed samples that are then processed by the loop filter 219.

For the comparison, the FIG. 4b depicts a part of an HEVC decoder to explain operations 402 when Transform Skip is enabled, for the considered 4*4 blocks. The coefficients are decoded by the entropy decoder 301. A flag called "ts_flag" signalling if the block is using the Normal mode or the Transform Skip mode is decoded by the decoding module 403. Depending on the value of this flag, checked by the module 404, the Normal mode or the Transform Skip mode applies. In the normal mode, the decoded coefficients are processed by the inverse quantization module 211 and by the inverse transform module 212. In the Transform Skip mode, the decoded coefficients are processed by the inverse quantization module 211 and by the inverse Scaling module 405. Then the resulting signal, which corresponds to the prediction residual samples, is added to the intra prediction signal coming from the intra prediction module 303. The resulting signal 308 corresponds to the reconstructed samples that are then processed by the loop filter 219.

FIG. 5 depicts operations 501 in an HEVC encoder for the normal mode only, that is, when Transform Skip mode is disabled. In the normal mode, the intra prediction residual, resulting from the difference between the signal from the original images 101 and the signal delivered by the intra prediction module 217 and the intra/inter selection module 216, is transformed by the transform module 207, quantized by the quantization module 208, and the resulting quantized coefficients are sent to the entropy coding module 209 which is able to deliver the output bitstream 210. They are also inverse quantized by the inverse quantization module 211 and inverse transformed by the inverse transform module 212 to reconstruct the decoded residual signal, which is added to the intra prediction signal to generate the reconstructed signal. This reconstructed signal is then processed by the loop filtering 219. For inter prediction, reconstructed pictures are then stored 215, and use for the motion prediction (218).

FIG. 6 depicts operations 601 in an HEVC encoder when both the Normal mode and Transform Skip modes are checked for a 4×4 luma or chroma block of original images 101. In addition to the processing of the Normal mode (transform, quantization, inverse quantization, inverse transform described above), the processing of the Transform Skip mode is made by using the following modules. The intra prediction residual, resulting from the difference between the signal from the original images 101 and the signal delivered by the intra prediction module 217 and the intra/inter selection module 216, is scaled by a scaling module 602, quantized by the quantization module 208, and the resulting quantized coefficients are sent to the entropy coding module 209. They are also inverse quantized by the inverse quantization module 211 and inverse scaled by the inverse scaling module 603 to reconstruct the residual signal, which is added to the intra prediction signal to generate the reconstructed signal. A decision taken by a decision module 604 is applied to choose between the Normal mode and the Transform Skip mode, based typically on a rate-distortion criterion comparing the rate-distortion cost of both modes and choosing the one with the lowest rate-distortion cost. A flag named ts_flag, indicating if the Normal mode or the Transform Skip mode applies, is encoded by the encoding module 605 into the output bitstream 210. This reconstructed signal is then processed by the loop filtering 219. For inter prediction, reconstructed pictures are then stored 215, and used for the motion prediction 218.

SUMMARY OF THE INVENTION

The inventors have noticed that statistically, chroma blocks use the Transform Skip mode in specific configurations, related to their corresponding luma block state or to other properties such as the prediction mode of the chroma block. Following these observations, it is possible to make the encoding and decoding process relative to the Transform skip mode more efficient.

The proposed solution has two aspects: a normative one and a non-normative one.

Firstly a normative solution involves the encoding and decoding processes specification. According to the current HEVC specification (HM7.0) a flag is inserted for each block (luma and chroma) to signal if the block is T-Skipped (that is, applies the Transform Skip mode) or not. However, the inventors realised that in specific configurations, this flag can be inferred and does not need to be coded. Thus, coding the flag in all cases results in a lack of coding efficiency, since unnecessary bits are spent to code this flag.

Secondly a non-normative solution involves the encoding process specification. The encoding process comprises the processing of each block coded with the Normal mode or with the Transform Skip mode. Typically the encoder performs the encoding with the Normal mode first and measures the corresponding Rate-Distortion cost. Then it performs the encoding with the Transform Skip and measures the corresponding Rate-Distortion cost. The retained mode is the one minimizing the rate-distortion cost. However the inventors realised that in specific configurations, this processing is not required and the Normal mode can be implicitly chosen without any check. Thus, the current HEVC specification results in an unnecessary complexity.

The present invention has been devised to address one or more of the foregoing concerns.

According to a first aspect of the invention, there is provided a method of encoding a video signal having at least a first signal component corresponding to a first color, and a second signal component, associated with the first signal component and corresponding to a second color, each said signal component being divided into blocks, and each said block having one or more encodable units, and the encoding of at least one encodable unit of said second signal component being switchable between first and second modes, the method comprising:

excluding, for at least one said encodable unit of said second signal component, use of said second mode for the encoding of the second-signal-component encodable unit concerned when at least one predetermined condition is satisfied relating to an encoded block or encodable unit of said first signal component that corresponds to the second-signal-component encodable unit concerned; and/or at least one predetermined condition is satisfied relating to a prediction mode of the second-signal-component encodable unit concerned or of the block to which the second-signal-component encodable unit concerned belongs.

In this way, the first aspect of the invention allows speeding-up the encoding process. Optionally, a flag used to signal which mode the encoder used for encoding the encodable unit can be dispensed with when the use of the second mode is excluded, resulting in saving bandwidth.

More precisely, the solution speeds-up the encoding process with almost no impact on coding efficiency, since unnecessary checks related to chroma blocks are avoided in the encoding process.

Moreover, by avoiding the coding of unnecessary flags signaling the use of Transform Skip modes for some chroma blocks, a coding efficiency gain is obtained which reduces required bandwidth.

The video signal which is encoded is preferably a video residual obtained by forming the difference between the original video and a prediction signal, for instance an intra or inter prediction signal.

Of course the first aspect of the invention could apply to more than two signal components respectively representing more than two colors. For example a first signal component can represent a Luma component and a second and a third signal components can represent two Chroma components.

For instance, the encodable unit may be a transform unit.

In preferred embodiments, the encoding in the first mode may include a transforming step for transforming an encodable unit into coefficients, and the encoding in the second mode excludes the transforming step.

According to one embodiment, the or one said predetermined condition may be that the first-signal-component block corresponding to the second-signal-component encodable unit concerned comprises only one encodable unit.

According to another embodiment, the or one said predetermined condition may be that the first-signal-component block corresponding to the second-signal-component encodable unit concerned is a sub-divided block having at least two encodable units, and the second mode is used for encoding fewer than a predetermined number of the encodable units of the sub-divided first-signal-component block.

According to another embodiment, the or one said predetermined condition may be that the first-signal-component block corresponding to the second-signal-component encodable unit concerned is a sub-divided block having at least two encodable units and the second mode is not used for encoding any of the encodable units of the sub-divided first-signal-component block.

According to another embodiment, the or one said predetermined condition may be that a prediction mode of the second-signal-component block concerned differs from a predetermined prediction mode or from each prediction mode of a set of predetermined prediction modes.

Preferably, the predetermined prediction mode may be one of the Planar mode, the DC mode, the Horizontal mode, the Vertical mode, the LM mode, the Diagonal left down, the Diagonal right top, and the Diagonal up left, or the set of predetermined prediction modes includes one or a combination of these prediction modes.

The previously mentioned embodiments can be combined: for example, two predetermined conditions have to be satisfied.

According to one embodiment, when the predetermined condition is not satisfied, or none of the predetermined conditions, is satisfied, the method may comprise selecting which of the first and second encoding modes to use for the encoding of the second-color-component encodable unit concerned based on a predetermined criterion.

In preferred embodiments, the first signal component may be a Luma signal component and the second signal components is a Chroma signal components.

In preferred embodiments the first signal component may be a Chroma signal component and the second signal components is a Luma signal components.

Preferably, the or each said encodable unit is a transform unit.

In preferred embodiments, the first mode is the Normal HEVC mode and the second mode is the Transform Skip HEVC mode.

Preferably, the video signal represents a prediction residual.

According to a one embodiment, the method further comprises:

transmitting to a decoder a flag for each said second-signal-component encodable unit for which said second mode was not excluded, which flag is usable by a decoder to determine which of the first and second modes was used to encode the encodable unit concerned, no such flag being transmitted to the decoder for each said second-signal-component encodable unit for which said second mode was excluded.

According to another aspect of the invention, there is provided a method of decoding coefficients of a video signal, having at least a first signal component corresponding to a first color, and a second signal component associated with the first signal component and corresponding to a second color, each said signal component being divided into blocks comprising at least one coefficient, and each block having one or more decodable units, and the decoding of at least one decodable units of the second signal component, being switchable between first and second modes, the method comprising:

excluding, for at least one decodable unit of the second signal component, the use of said second mode for the decoding of the decodable unit concerned when
at least one predetermined condition is satisfied relating to an encoded block or decodable unit of said first signal component that corresponds to the second-signal-component decodable unit concerned; and/or
at least one predetermined condition is satisfied relating to a prediction mode of the second-signal-component decodable unit concerned or of the block to which the second-signal-component decodable unit concerned belongs.

For example, the decodable units may be transform units.

In one embodiment, the method comprises in the event that the or at least one said predetermined condition is satisfied generating a flag having a predetermined value indicating that the encoder did not use said second mode.

According to one embodiment, the decoding in the first mode may include an inverse transforming step for transforming coefficients into decodable units and the decoding in the second mode excludes the inverse transforming step.

According to one embodiment, the or one said predetermined condition may be that the first-signal-component block corresponding to the second-signal-component decodable unit concerned comprises only one decodable unit.

According to another embodiment, the or one said predetermined condition may be that the first-signal-component block corresponding to the second-signal-component decodable unit concerned is a sub-divided block having at least two decodable units, and the second mode is used for decoding fewer than a predetermined number of the decodable units of the sub-divided first-signal-component block.

According to another embodiment, the or one said predetermined condition may be that the first-signal-component block corresponding to the second-signal-component decodable unit concerned is a sub-divided block having at least two decodable units and the second mode is not used for decoding any of the decodable units of the sub-divided first-signal-component block.

According to another embodiment, the or one said predetermined condition may be that a prediction mode of the second-signal-component block concerned differs from a predetermined prediction mode or from each prediction mode of a set of predetermined prediction modes.

According to one embodiment, the predetermined prediction mode is one of the Planar mode, the DC mode, the Horizontal mode, the Vertical mode, the LM mode, the Diagonal left down, the Diagonal right top, and the Diagonal up left, or the set of predetermined prediction modes includes one or a combination of these prediction modes.

The previously mentioned embodiments can be combined: for example, two predetermined conditions have to be filled.

In a preferred embodiment, when the predetermined condition is not satisfied, or none of the predetermined conditions is satisfied, employing a flag received from an encoder to decide which of the first and second encoding modes to use for the decoding of the second-color-component decodable unit concerned based on a predetermined criterion.

According to one embodiment, the first signal component is a Luma signal component and the second signal component is a Chroma signal component.

According to another embodiment the first signal component is a Chroma signal component and the second signal component is a Luma signal component.

For example, a decodable unit is a transform unit.

In a preferred embodiment, the first mode is the Normal HEVC mode and the second mode is the Transform Skip HEVC mode.

Preferably, the video signal represents a prediction residual.

According to another aspect of the invention, there is provided an encoder for encoding a video signal having at least a first signal component, corresponding to a first color, and a second signal component associated with the first signal component and corresponding to a second color, each said signal component being divided into blocks, and each said block having one or more encodable units, and the encoding of at least one encodable unit of said second signal component being switchable between first and second modes, the encoder comprising:

means for excluding, for at least one said encodable unit of said second signal component, use of said second mode for the encoding of the second-signal-component encodable unit concerned when
at least one predetermined condition is satisfied relating to an encoded block or encodable unit of said first signal component that corresponds to the second-signal-component encodable unit concerned; and/or
at least one predetermined condition is satisfied relating to a prediction mode of the second-signal-component encodable unit concerned or of the block to which the second-signal-component encodable unit concerned belongs.

According to one embodiment, the encoding in the first mode includes transforming an encodable unit into coefficients, and the encoding in the second mode excludes said transforming of an encodable unit into coefficients.

For example, an encodable unit may be a transform unit.

According to another aspect of the invention, there is provided a decoder for decoding coefficients of a video signal, having at least a first signal component corresponding to a first color, and a second signal component associated with the first signal component and corresponding to a second color, each said signal component being divided into blocks comprising at least one coefficient, and each block having one or more decodable units, and the decoder being configured so that the decoding of at least one decodable unit of the second signal component is switchable between first and second modes, the decoder comprising:

means for excluding for at least one said decodable unit of said second signal component, use of said second mode for the encoding of the second-signal-component decodable unit concerned when
at least one predetermined condition is satisfied relating to an encoded block or decodable unit of said first signal component that corresponds to the second-signal-component decodable unit concerned; and/or
at least one predetermined condition is satisfied relating to a prediction mode of the second-signal-component decodable unit concerned or of the block to which the second-signal-component decodable unit concerned belongs.

According to one embodiment, the decoder may further comprise means for generating a flag having a predetermined value indicating that the encoder did not use said second mode, in the event that the or one said predetermined condition is satisfied.

According to one embodiment, the decoding in the first mode may include inverse transforming, and the decoding in the second mode excludes said inverse transforming.

For example, the or each said decodable unit may be a transform unit.

According to another aspect of the invention, there is provided program which, when executed by computer or processor, causes the computer or processor to carry out an encoding method described herein.

According to another aspect of the invention, there is provided a program which, when executed by computer or processor, causes the computer or processor to carry out a decoding method described herein.

According to another aspect of the invention, there is provided a computer-readable storage medium storing the program mentioned herein.

DETAILED DESCRIPTION OF EMBODIMENTS OF THE INVENTION

One preferred embodiment of the invention relates to the checking of the Transform Skip mode for chroma blocks. In this preferred embodiment, the considered chroma format is YUV 4:2:0, meaning that to one 2N×2N luma block (Y component) corresponds two N×N chroma blocks (U and V component), N being an integer value related to the size of the blocks. We consider one chroma block (U or V) to be processed (either encoded or decoded), and the related 2N×2N luma block. The invention relates to the processing (either encoding or decoding) of this chroma block. As in its current design, HEVC considers Transform Skip mode only for 4×4 blocks, we consider in the sequel 4×4 chroma blocks, and their related 8×8 luma block. Of course, the invention can be generalized to other block sizes (e.g. 8×8 chroma blocks and their related 16×16 luma block) and other chroma formats (e.g. YUV 4:4:4 or RGB 4:4:4).

More generally, the invention concerns at least two color or spectral video content represented by first and second signal components.

The figures below refer to Coding units and Transform units. But these Coding units are just examples of blocks and these Transform units are just examples of encodable units.

Embodiments of the invention can be implemented in a non-normative way (involving only the encoder) or in a normative way (involving the encoder and the decoder, as well as the decoder specification standard). In both cases, the principle is to check conditions related to the corresponding luma block of the considered chroma blocks, or related to the prediction mode of these considered chroma blocks.

In a preferred embodiment, the invention applies to residual blocks resulting from intra prediction. This concept can also apply to inter prediction residual blocks. Both prediction modes are well known by the man skilled in the art.

Figure 1:
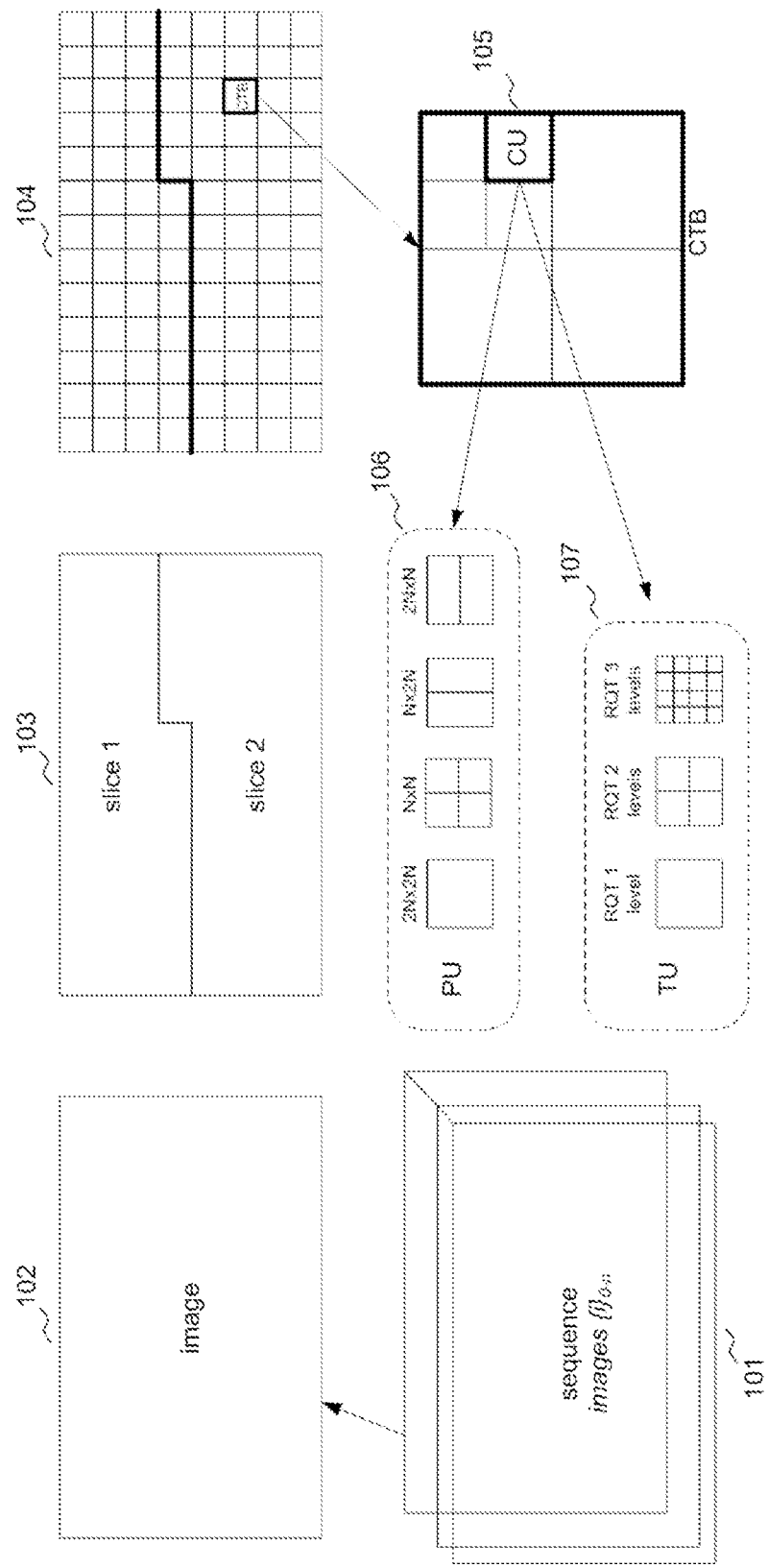
FIG. 1 illustrates the coding structure used in HEVC.
Figure 2:
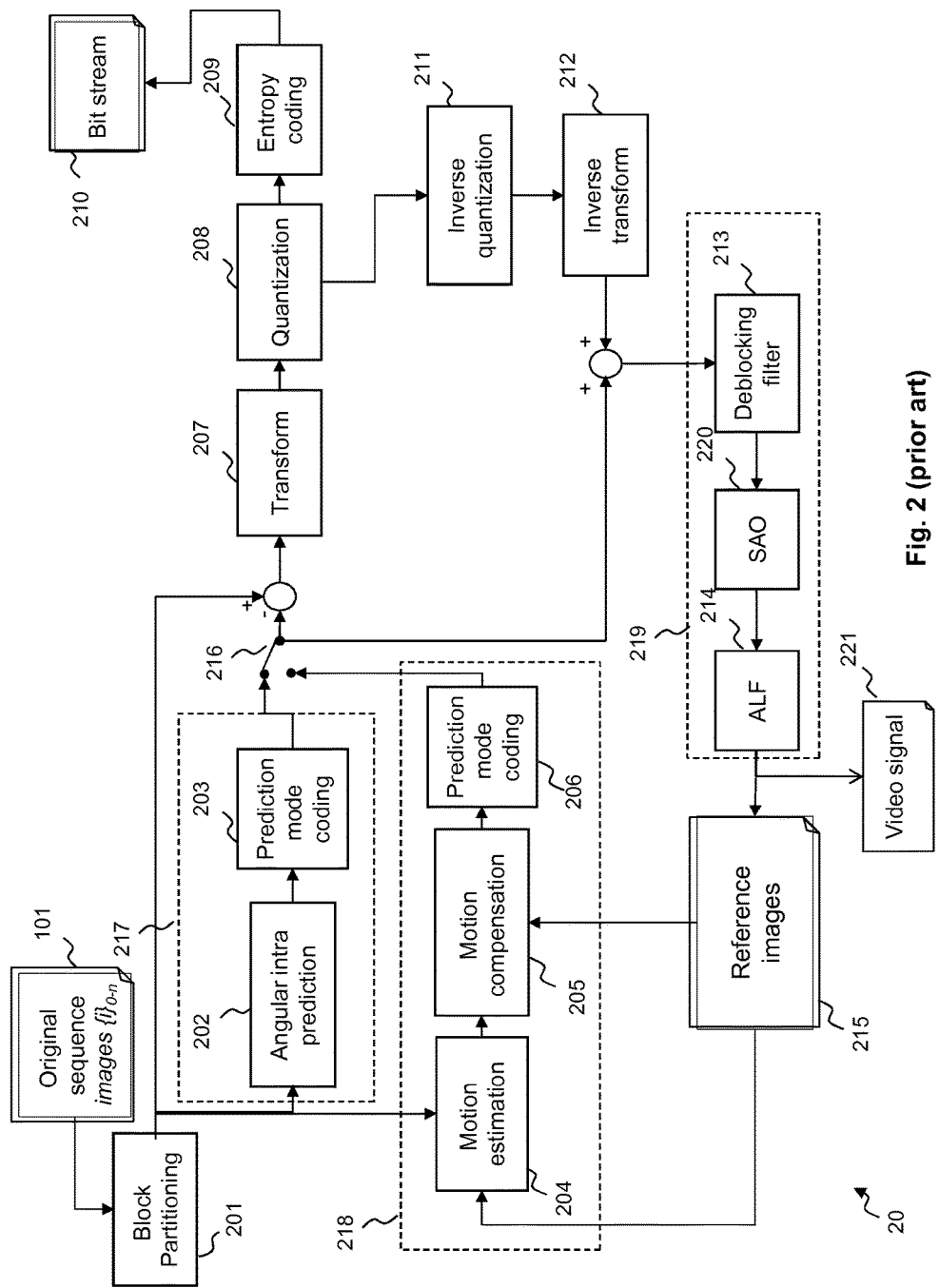
FIG. 2 is a schematic block diagram of an encoder according to the prior art.
Figure 3:
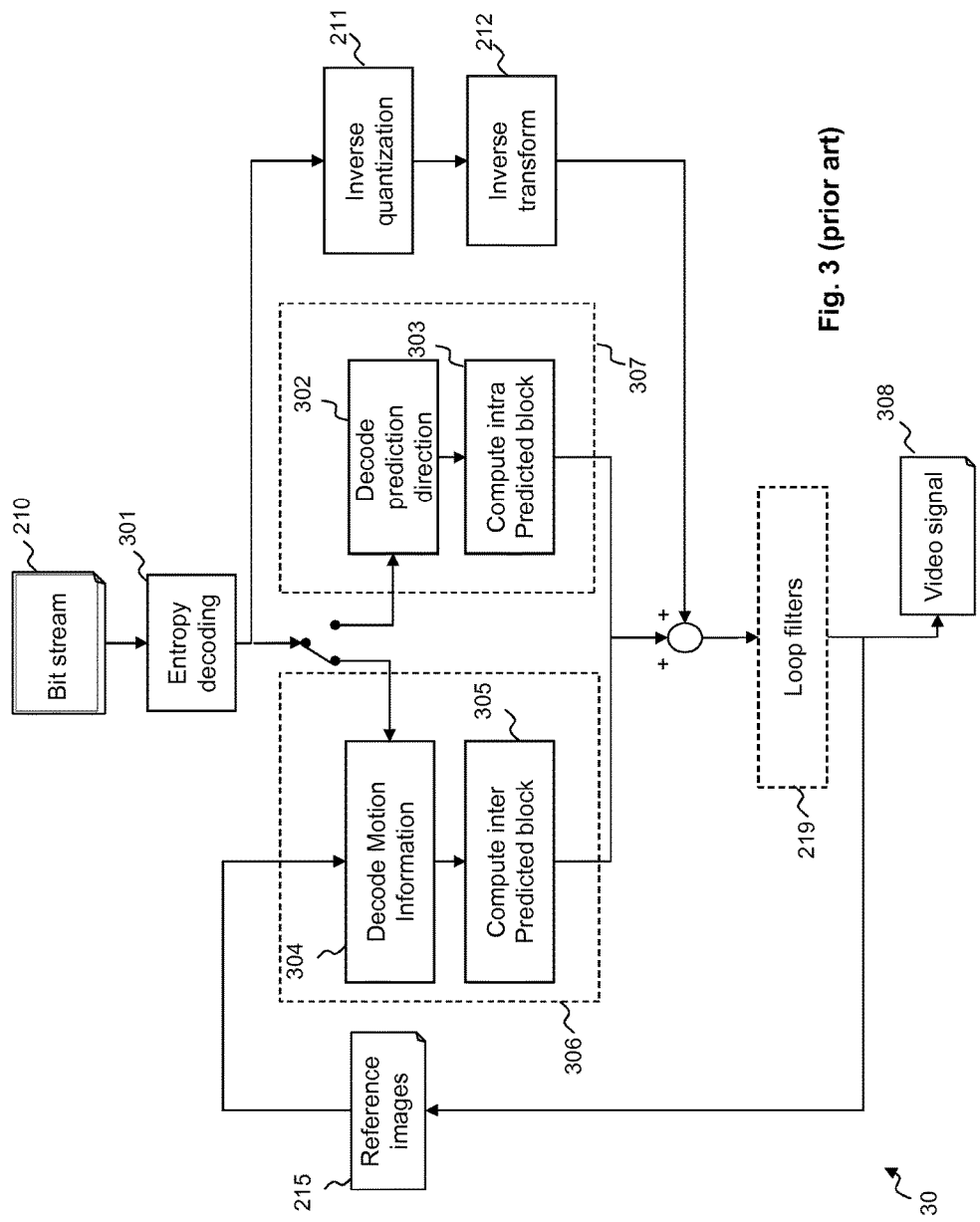
FIG. 3 is a schematic block diagram of an decoder according to the prior art.
Figure 4A:
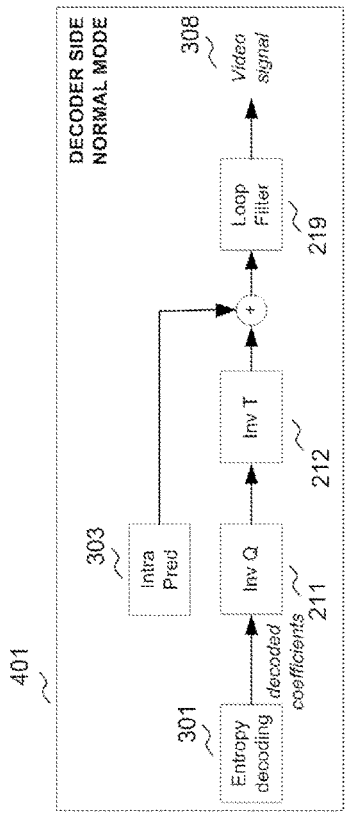
FIGS. 4a and 4b are schematic block diagrams representing more in detail a decoder according to the prior art, relative to the used mode: the Normal mode or the Transform skipped mode.
Figure 7:
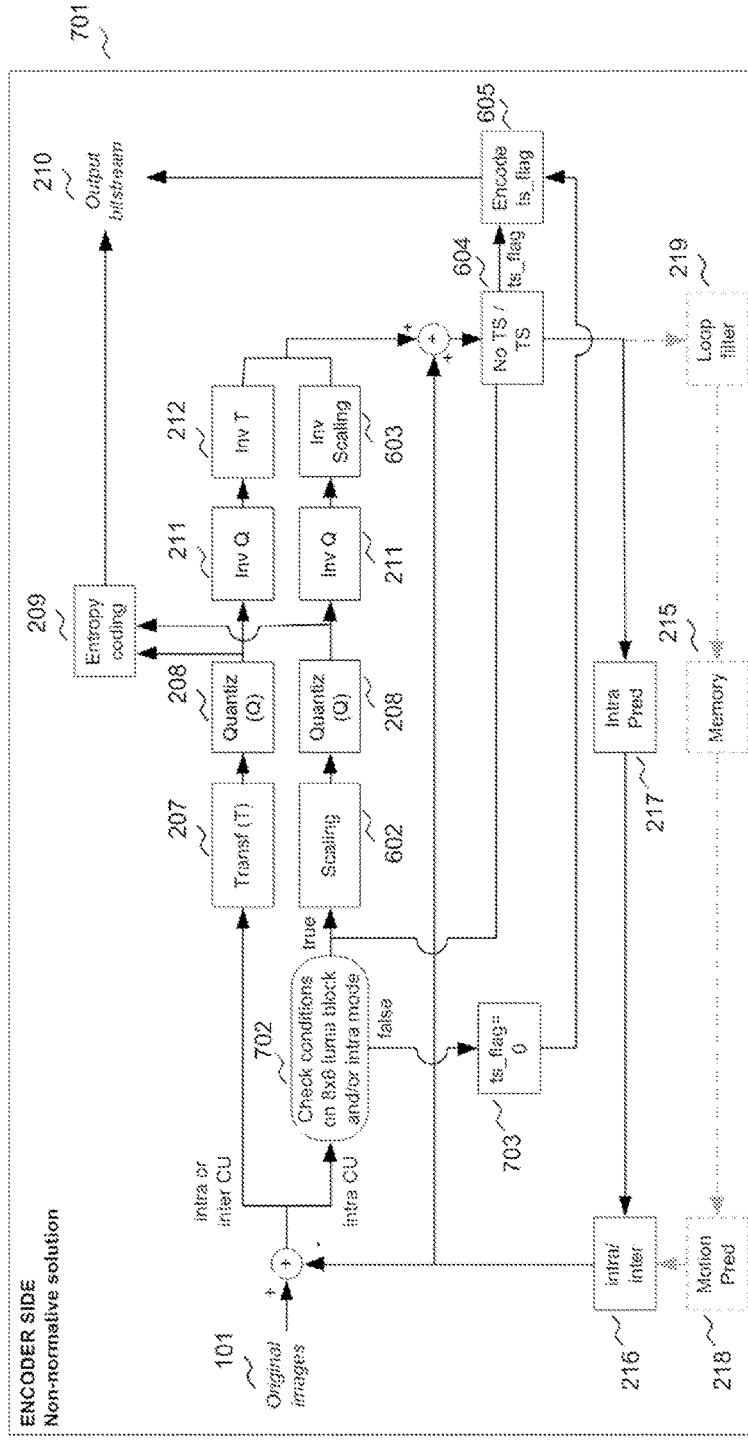
FIGS. 7 and 8 are schematic block diagrams representing examples of encoders embodying the invention.

FIG. 7 shows an example of an encoder 701 according to the invention. In the non-normative solution, only the encoder is affected. The modules which have been already described in the previous figures are not detailed again. They keep the same references. An example of a corresponding decoder could be the one represented in FIGS. 4a and 4b, signifying that no change of the standard specification is required.

When the chroma block is intra coded, the Normal mode involving the successive modules for transforming 207, quantizing 208, inverse quantizing 211 and inverse transforming 212 is always evaluated.

Once the 8×8 luma block related to the chroma block has been processed, predetermined conditions related to this luma block or to the intra prediction mode of the chroma block are checked by a checking module 702. Those conditions will be described more in detail below.

If these conditions are satisfied (true), the Transform Skip mode is evaluated, meaning that the successive modules for scaling 602, quantizing 208, inverse quantizing 211 and inverse scaling 603 are applied. Also the choice between Normal mode and Transform Skip is made by a module 604, based for instance on a rate-distortion cost criterion.

If these conditions are not satisfied (false), ts_flag is enforced to 0 by a module 703, meaning that the Transform Skip mode is not evaluated and that the Normal mode is selected. The other modules related to the Transform Skip mode evaluation are skipped.

In this example, in both cases (conditions false or true), the ts_flag is coded by a coding module 605 into the output bitstream 210. This is why this solution is non-normative since it does not change the decoding process. The decoder is not changed compared to decoder illustrated in the FIG. 4b, since the ts_flag is always encoded (here for the 4×4 chroma blocks).

If the tested conditions in the module 702 only relate to the intra prediction mode of the chroma block, and not to the luma block, it is not necessary to have previously processed the luma block and the processes for luma and chroma can be achieved independently (and for instance in parallel).

Figure 8:
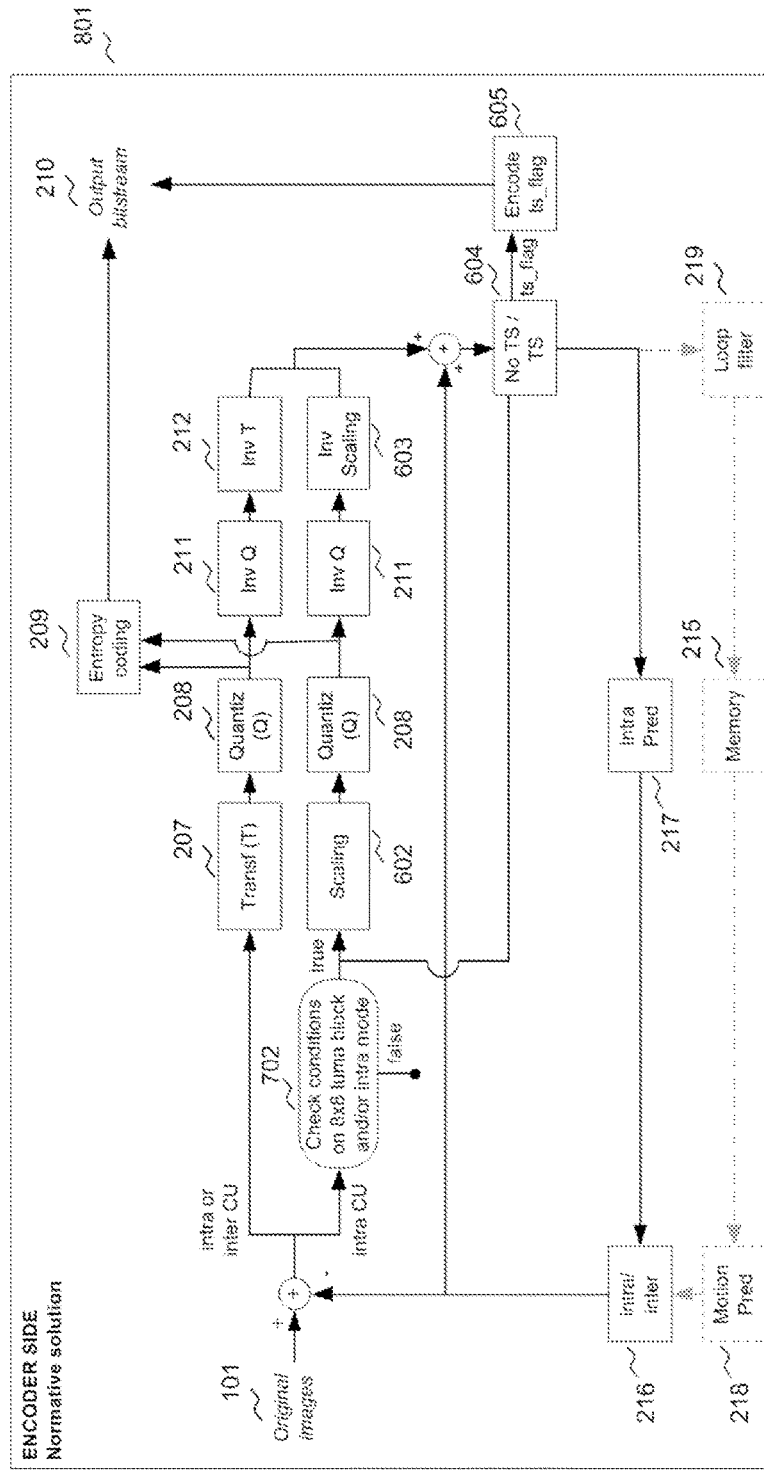

FIG. 8 shows another example of an encoder 801 according to the invention. This example, unlike the FIG. 7 example, represents a normative solution, and both the encoder and decoder are affected. The difference with the FIG. 7 example is that when the conditions related to the luma block or to the intra prediction mode of the chroma block checked in the module 702 are false, no action is taken. In particular, the ts_flag is not coded, which saves the bit required to encode this flag.

Figure 9:
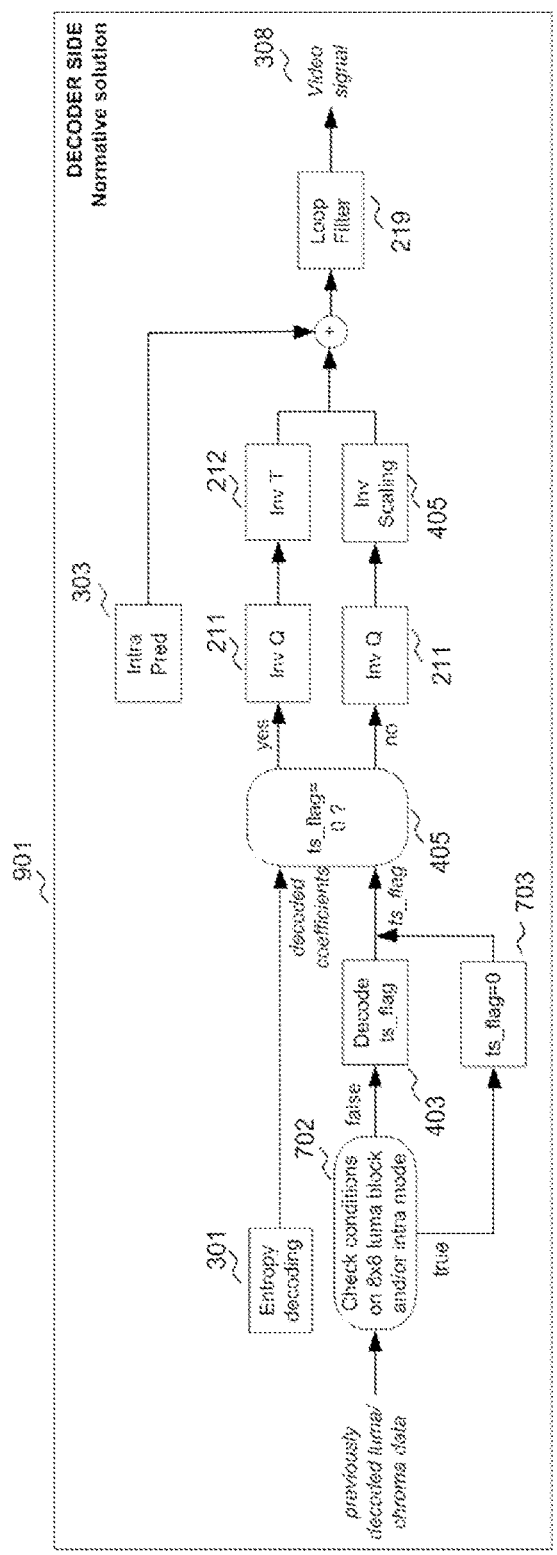
FIG. 9 is a schematic block diagram representing a decoder embodying the invention and suitable for use with the encoder of FIG. 8.

A decoder 901 suitable for use with the encoder of FIG. 8 is depicted in FIG. 9. First the coefficients are decoded by the entropy decoder 301. Regarding the decoding of the ts_flag, a prior check is done, by a checking module 702, on the predetermined conditions related to the corresponding luma block of the considered chroma blocks, or related to the prediction mode of these considered chroma blocks. The input of this block is the data previously decoded before processing the considered chroma block to be processed.

If the conditions are satisfied (true), the decoder knows that the ts_flag is equal to 0, see the module 703, meaning that the Normal mode applies. In this case it is not needed to decode the ts_flag.

If the conditions are not satisfied (false), the decoder has to decode the ts_flag, via a module 403. Based on the decoded value, the decoder then applies the Normal mode if ts_flag=0, involving successive modules of inverse quantization 211 and inverse transform 212 (previously mentioned), or the Transform Skip mode if ts_flag=1, involving successive modules of inverse quantization 211 and inverse scaling 405.

Figure 4B:
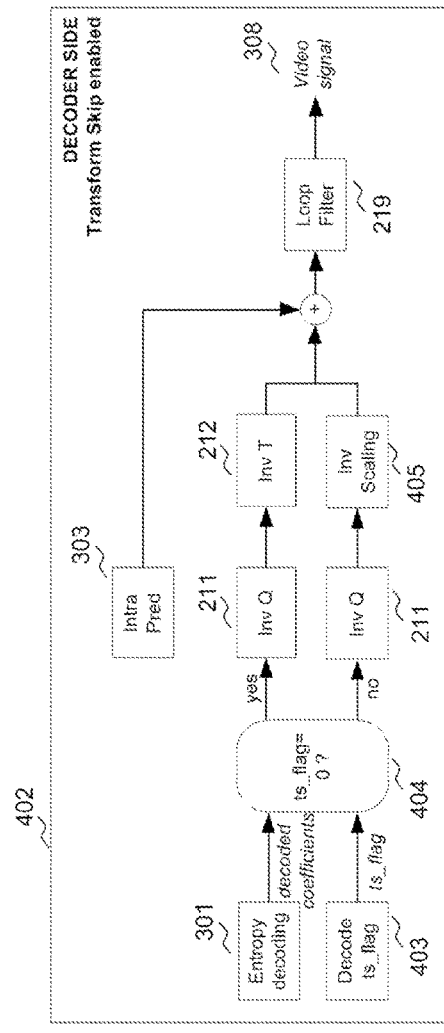
Figure 5:
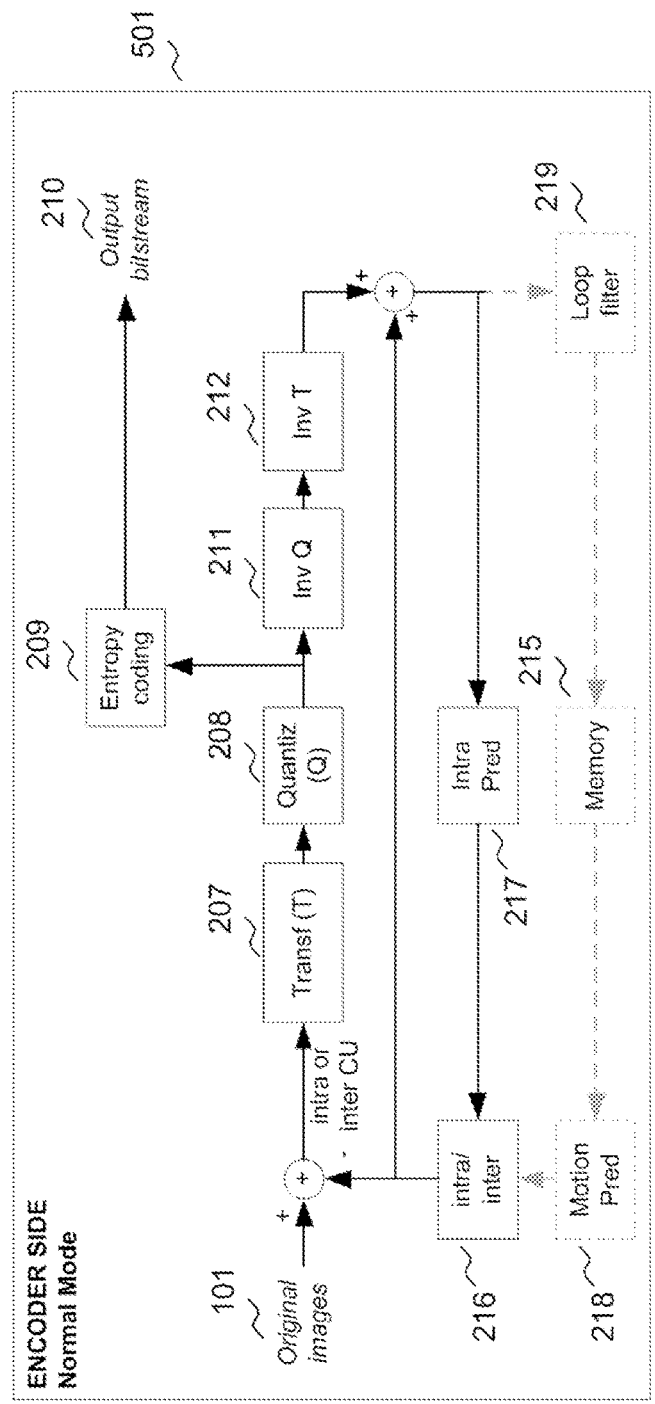
FIGS. 5 and 6 are schematic block diagrams representing more in detail an encoder according to the prior art, relative to the used mode: the Normal mode or the Transform skipped mode.
Figure 6:
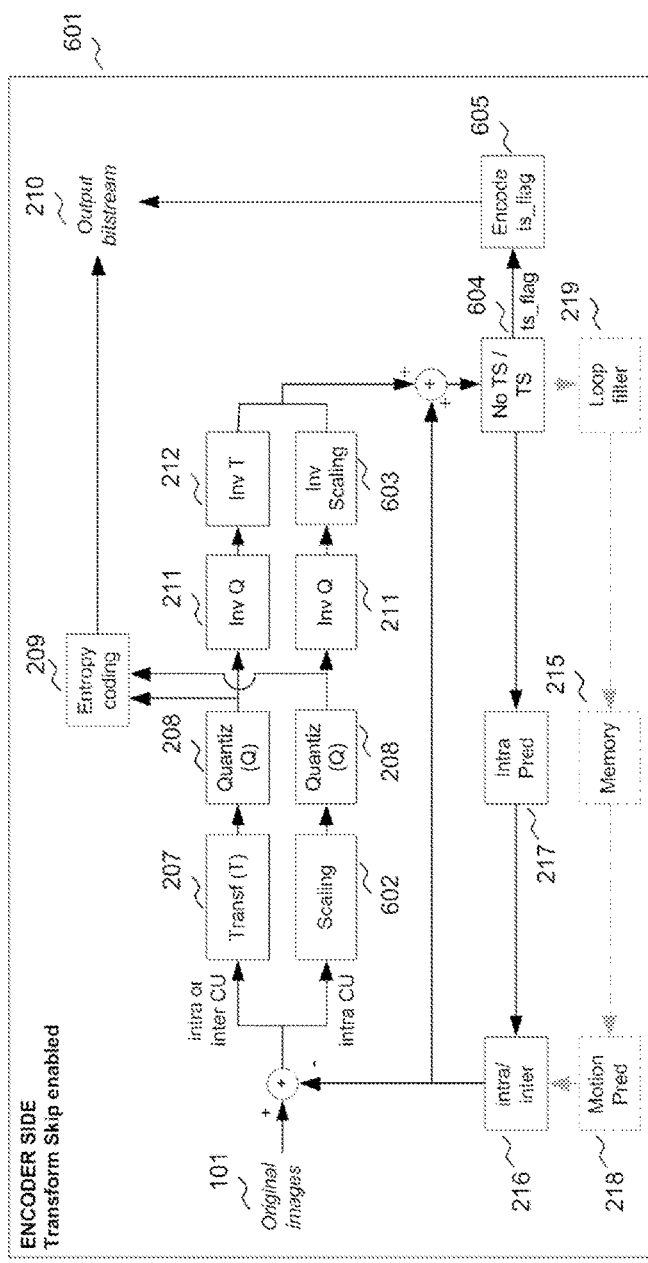

The rest of the decoder remains unchanged compared to the decoder illustrated of FIG. 4b.

As for the non-normative solution, if the tested conditions in the module 702 only relate to the intra prediction mode of the chroma block, and not to the luma block, it is not necessary to have previously processed the luma block and the processes for luma and chroma can be achieved independently (and for instance in parallel).

The following figures describe several specific embodiments of the encoding and decoding process relative to the invention. Those figures propose processes with 8*8 luma blocks and 4*4 chroma blocks as an example. Of course, blocks with different sizes can be processed. For instance, it can apply to 16*16 luma blocks and corresponding 8*8 chroma blocks.

Moreover, the steps with identical references imply the identical processes.

Figure 10A:
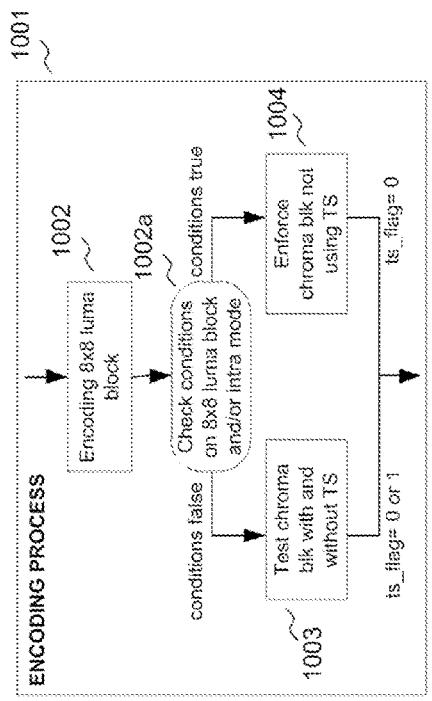
FIGS. 10a and 10b are diagrams for use in explaining operations in methods of encoding and decoding, respectively, embodying the present invention.
Figure 10B:
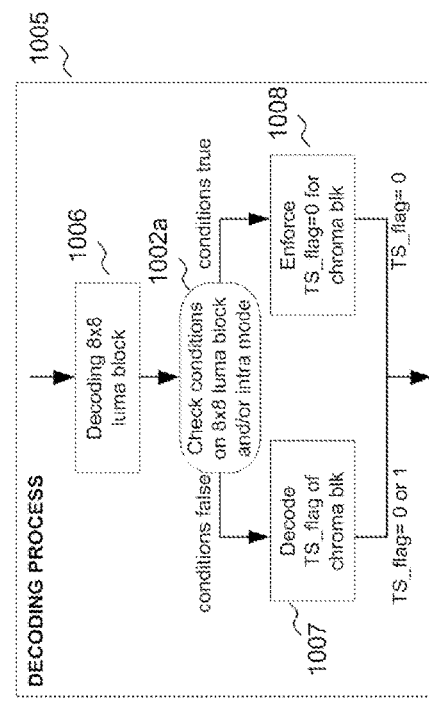

FIGS. 10a and 10b present block diagrams for use in explaining the encoding and decoding processes according to the invention respectively. The figures focus on the transform step.

FIG. 10a illustrates the encoding process 1001. Once the 8×8 luma block has been encoded (or more generally the block of a first signal component corresponding to a first color), 1002, the conditions related to the corresponding luma block of the considered chroma blocks (or more generally the block of a second signal component corresponding to a second color), or related to the prediction mode of these considered chroma blocks, are checked 1002a. If these conditions are false, the chroma block is evaluated both with the Normal mode (also called first mode) and with the Transform Skip mode (also called second mode), 1003. This enables determining the value of the flag referenced ts_flag, previously mentioned and also called principal flag. If these conditions are true, the chroma block is enforced to use the Normal mode and the ts_flag is enforced to "0", 1004. In other words, use of the Transform skip mode (or TS mode) is excluded for the encoding of this chroma block.

FIG. 10b describes the corresponding decoding process, 1005. Once the 8×8 luma block has been encoded, 1006, the conditions related to the corresponding luma block of the considered chroma blocks, or related to the prediction mode of these considered chroma blocks, are checked, 1002a. If these conditions are false, the ts_flag is decoded, 1007. Otherwise, the ts_flag is inferred to have value "0", 1008 without needing any decoding of this flag.

In an embodiment of the invention, the conditions tested (as described below) consist of checking if the 8×8 luma block is coded as four 4×4 luma Transform Units or as one 8×8 luma Transform Unit.

Figure 11C:
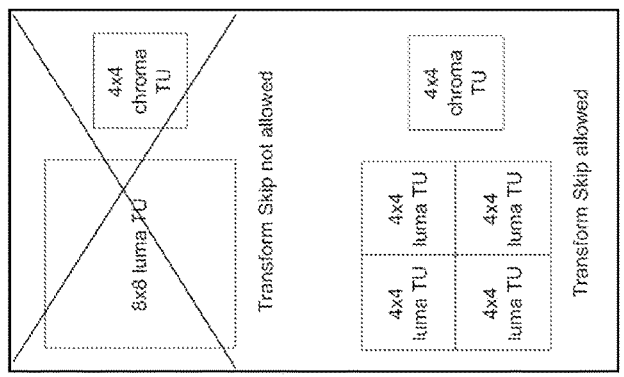
FIG. 11c illustrates luma and chroma transform units relative to the first embodiment.
Figure 11A:
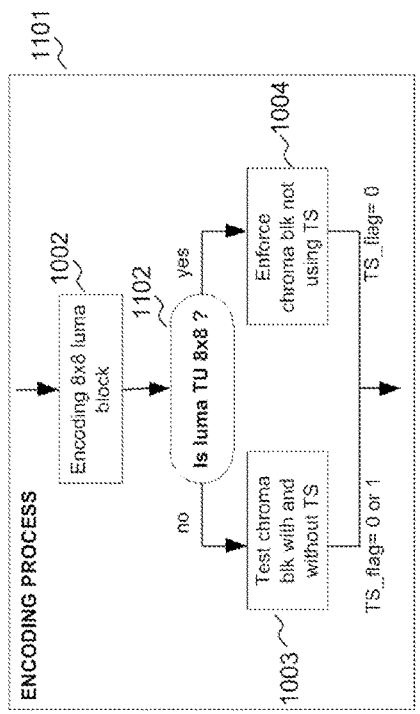
FIGS. 11a and 11b are flow charts of a method of encoding and decoding according to a first embodiment of the invention.

As depicted in FIG. 11a, at the encoding process 1101, once the 8×8 luma block has been processed, 1002, a check on the size of the luma TU is achieved in, 1102. If the luma TU is not of size 8×8, the chroma block is evaluated both with the Normal mode and with the Transform Skip mode, 1003. If the luma TU is of size 8×8, the chroma block is enforced to use the Normal mode, and the ts_flag is enforced to 0, 1004. So it can be seen that the conditions checking, 1102 consists in this case of checking the luma TU size.

Figure 11B:
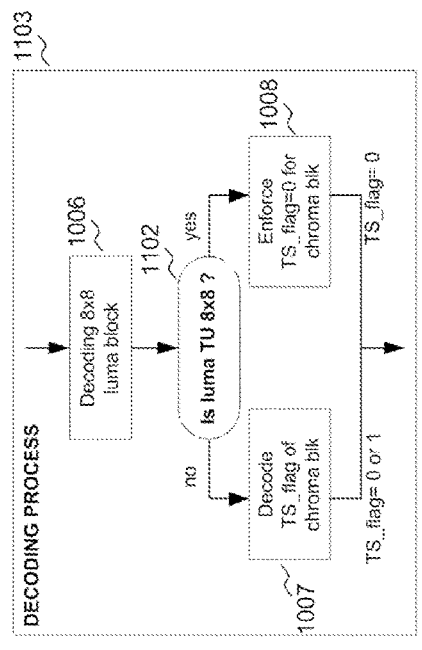

FIG. 11b describes the corresponding decoding process, 1103. Once the 8×8 luma block has been processed, 1006, a check on the size of the luma TU is achieved in 1102. If the luma TU is not of size 8×8, the ts_flag is decoded, 1007. Otherwise, the ts_flag is inferred to 0, 1008 without needing any decoding of this flag.

The concept is illustrated in FIG. 11c, showing that Transform Skip is not allowed when the luma TU is of size 8×8, but is enabled when the luma TU is split into four 4×4 TUs.

When the change is normative, it involves changes in the decoding process. Therefore the HEVC specification has to be modified. The following syntax changes are made compared to the specification corresponding to the HM7.0 (HEVC specification issued in June 2012).

The syntax for the transform_unit function is the following. The changes compared to HM7.0 are highlighted in grey and bold font.

```
transform_unit( x0L, y0L, x0C, y0C, log2TrafoWidth, log2TrafoHeight, trafoDepth, blkIdx ) {    Descriptor
...
  if( cbf_luma[ x0L ][ y0L ][ trafoDepth ])
    residual_coding( x0L, y0L, log2TrafoWidth, log2TrafoHeight, scanIdx, 0, 1)
  if( log2TrafoSize > 2 ) {
    if( cbf_cb[ x0C ][ y0C ][ trafoDepth ])
      residual_coding( x0C, y0C, log2TrafoWidth − 1, log2TrafoHeight − 1, scanIdxC, 1, 0 )
    if( cbf_cr[ x0C ][ y0C ][ trafoDepth ])
      residual_coding( x0C, y0C, log2TrafoWidth − 1, log2TrafoHeight − 1, scanIdxC, 2, 0 )
  } else if( blkIdx == 3 ) {
    if( cbf_cb[ x0C ][ y0C ][ trafoDepth ])
      residual_coding( x0C, y0C, log2TrafoWidth, log2TrafoHeight, scanIdxC, 1, 1 )
    if( cbf_cr[ x0C ][ y0C ][ trafoDepth ])
      residual coding( x0C, y0C, log2TrafoWidth, log2TrafoHeight, scanIdxC, 2, 1 )
    }
  }
}
```

The syntax of the residual_coding function is the following.

```
residual_coding( x0, y0, log2TrafoWidth, log2TrafoHeight, scanIdx, cIdx, useTS ) {    Descriptor
...
if( transform_skip_enabled_flag && useTS && !cu_ transquant_bypass _flag &&
    (PredMode == MODE_INTRA) &&
    ( log2TrafoWidth == 2) && (log2TrafoHeight == 2) )
  transform_skip_flag[ x0 ][ y0 ][ cIdx ]                                              ae(v)
...                                                                                   ae(v)
```

In the table above, useTS is an auxiliary flag or variable, deduced by the decoding process, that indicates if the syntax element ts_flag must be decoded or not. When useTS indicates that ts_flag is not decoded, ts_flag is enforced to 0.

Referring to the modified syntax of transform_unit(•), the following applies:
  useTS is set to 1 for the luma TU;
  when log 2TrafoSize>2 (which indicates that the luma TU is of size greater than 4×4), useTS is set to 0 for the two chroma blocks;
  Otherwise (log 2TrafoSize is equal to 2, which indicates that the luma TU is of size 4×4), useTS is set to 1 for the two chroma blocks.

Note that the auxiliary flag useTS is not transmitted by the encoder to the decoder because the decoder can infer this flag based on the same conditions that the encoder applied to decide whether or not to exclude the use of the Transform Skip mode. No extra signalling is required.

In another embodiment of the invention, the conditions tested are based on the number of 4×4 Transform Units of the 8×8 luma block that are Transform-skipped. If this number is above a given threshold, then the Transform Skip mode is enabled for the chroma block. Otherwise it is disabled.

Figure 12A:
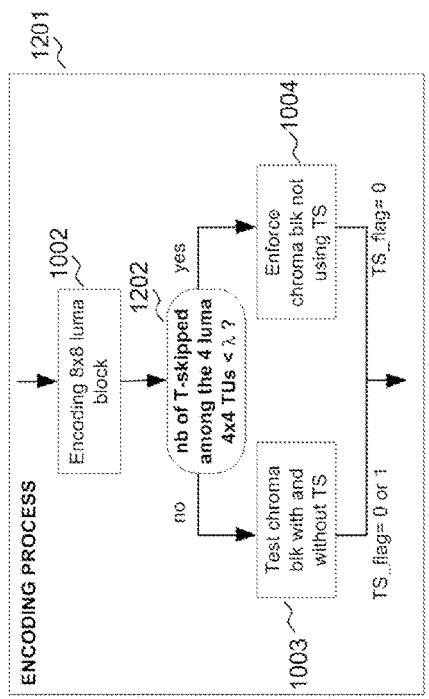
FIGS. 12a and 12b are flow charts of a method of encoding and decoding according to a second embodiment of the invention.

As depicted in FIG. 12a, for the encoding process, 1201, once the 8×8 luma block has been processed, 1002, the number of 4×4 TUs of the 8×8 luma block that use Transform Skip is compared to a given threshold 1202. If this number is greater than or equal to λ, the chroma block is evaluated both with the Normal mode and with the Transform Skip mode, 1003. If this number is less than 2, the chroma block is enforced to use the Normal mode and the ts_flag is enforced to 0, 1004. So it can be seen that the conditions checking consists in this case of checking the number of 4×4 luma TUs that are skipped, 1202. For example, can be equal to one.

Figure 12B:
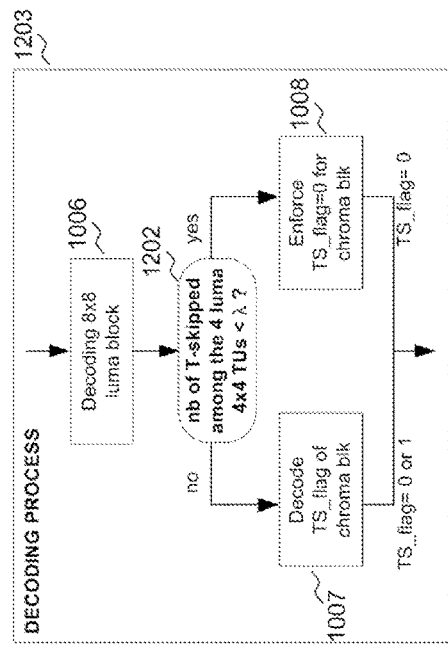

FIG. 12b describes the corresponding decoding process, 1203. Once the 8×8 luma block has been processed, 1006, a check on the number of 4×4 luma TUs that are skipped is achieved, 1202. If this number is greater than or equal to 2, the ts_flag is decoded, 1007. Otherwise, the ts_flag is inferred to have value "0", 1008 without needing any decoding of this flag.

In a preferred embodiment, is set to 1, meaning that if none of the four 4×4 luma TUs is skipped, then ts_flag is enforced to 0 for the chroma block, implying that the chroma block mandatorily applies the transform (encoding process) or inverse transform (decoding process).

When the change is normative (as explained above), the following syntax changes are made compared to the specification corresponding to the HM7.0 (HEVC specification issued in June 2012).

The syntax for the transform_unit function is the following. The changes compared to HM7.0 are highlighted in grey and bold font.

```
transform_unit( x0L, y0L, x0C, y0C, log2TrafoWidth, log2TrafoHeight, trafoDepth, blkIdx ) {   Descriptor
...
  if( cbf_luma[ x0L ][ y0L ][ trafoDepth ])
    residual_coding( x0L, y0L, log2TrafoWidth, log2TrafoHeight, scanIdx, 0, 1)
  if( log2TrafoSize > 2 ) {
    if( cbf_cb[ x0C ][ y0C ][ trafoDepth ])
      residual_coding( x0C, y0C, log2TrafoWidth − 1, log2TrafoHeight − 1, scanIdxC, 1, 1)
    if( cbf_cr[ x0C ][ y0C ][ trafoDepth ])
      residual_coding( x0C, y0C, log2TrafoWidth − 1, log2TrafoHeight − 1, scanIdxC, 2, 1)
  } else if( blkIdx == 3 ) {
```

```
    useTS = ( transform_skip_flag [ x0L − 1 ][ y0L − 1 ][ 0 ] +
        transform_skip_flag [ x0L ][ y0L − 1 ][ 0 ] +
        transform_skip_flag [ x0L − 1 ][ y0L ][ 0 ] +
        transform_skip_flag [ x0L ][ y0L ][ 0 ]) < λ) ? 0 : 1
    if( cbf_cb[ x0C ][ y0C ][ trafoDepth ])
        residual_coding( x0C, y0C, log2TrafoWidth, log2TrafoHeight, scanIdxC, 1, useTS )
    if( cbf_cr[ x0C ][ y0C ][ trafoDepth ])
        residual_coding( x0C, y0C, log2TrafoWidth, log2TrafoHeight, scanIdxC, 2, useTS )
    }
  }
}
```

The syntax of the residual_coding function is the same as for the previous embodiment.

Referring to the modified syntax of transform_unit(•), the following applies:

useTS is set to 1 for the luma TU;

when log 2TrafoSize>2 (which indicates that the luma TU is of size greater than 4×4), useTS is set to 1 for the two chroma blocks;

Otherwise (log 2TrafoSize is equal to 2, which indicates that the luma TU is of size 4×4), useTS is computed by comparing the sum of the value of ts_flag of the four 4×4 luma TUs, to the threshold λ; the residual decoding of the two chroma blocks is then invoked with this value of useTS.

In another embodiment of the invention, the conditions tested are based on the intra chroma prediction mode (referenced as "IntraPredModeC") of the chroma block. A set of authorized modes (referenced as "ModeSet") is defined. This set can be computed off-line a priori based on statistical analysis of the distribution of intra chroma prediction modes when the chroma blocks are skipped. It can alternatively be dynamically changed and be embedded into the bitstream, for instance in the SPS, PPS or APS.

Figures 13A, 13B, 13C:
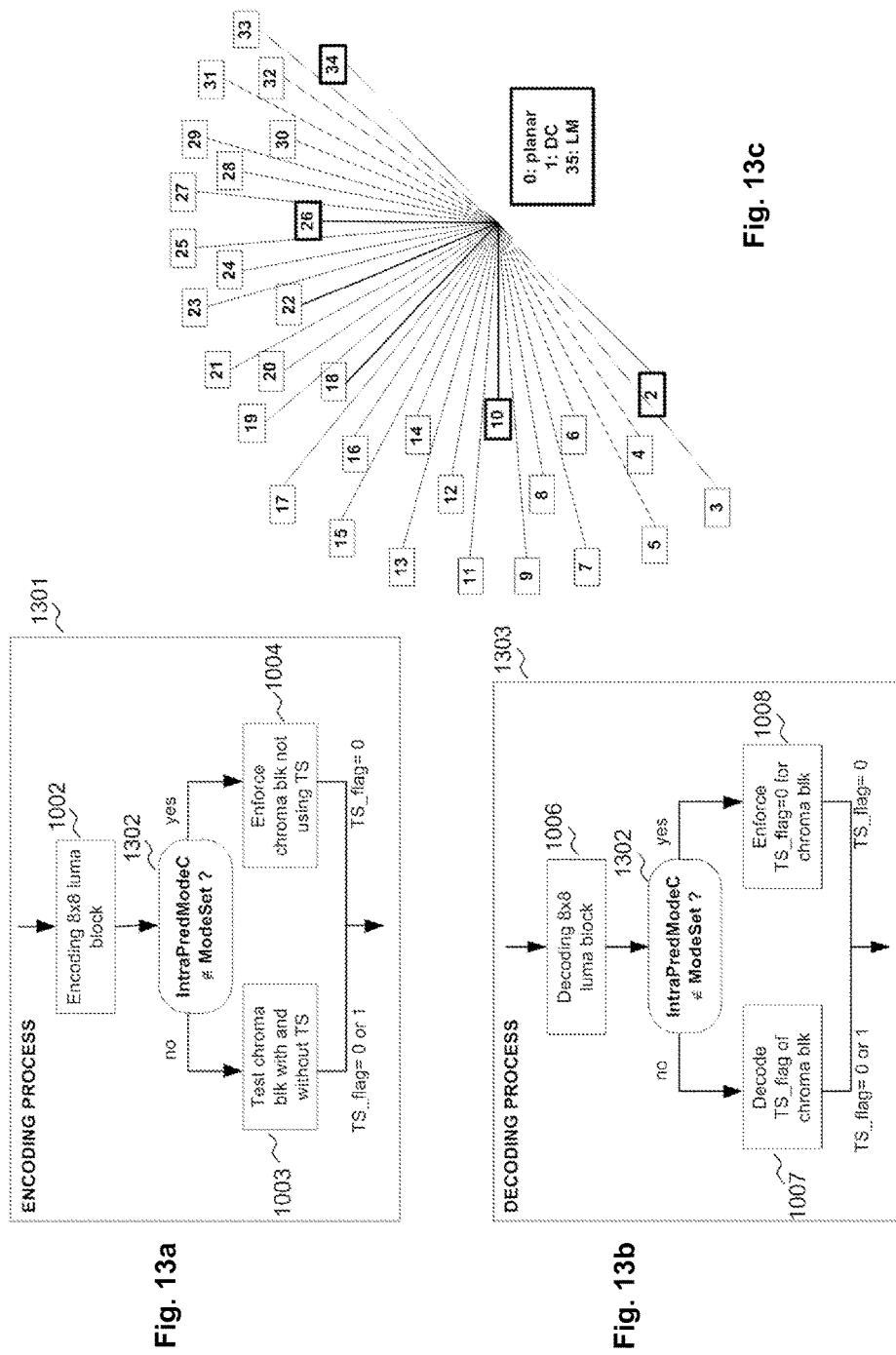
FIGS. 13a and 13b are flow charts of a method of encoding and decoding according to a third embodiment of the invention.
FIG. 13c schematically illustrates the index associated to each prediction mode.

As depicted in FIG. 13a, at the encoding process, 1301, once the 8×8 luma block has been processed, 1002, it is checked if the intra chroma prediction mode IntraPredModeC does not belong to the set of authorized intra modes ModeSet, 1302. If this condition is false, the chroma block is evaluated both with the Normal mode and with the Transform Skip mode, 1003. If this condition is true, the chroma block is enforced to use the Normal mode and the ts_flag is enforced to 0, 1004. So it can be seen that the conditions checking consists in this case of checking that the intra chroma prediction mode is among a set of authorized modes.

FIG. 13b describes the decoder side, 1303. Once the 8×8 luma block has been processed, 1006, it is checked if IntraPredModeC does not belong to the set of authorized intra modes ModeSet, 1302. If this condition is false, the ts_flag is decoded, 1007. Otherwise, the ts_flag is inferred to 0, 1008 without needing any decoding of this flag.

In a preferred embodiment, ModeSet is made of the following modes (the corresponding mode number in the latest HEVC specification—HM7—is also given):

Planar (mode 0)

DC (mode 1)

Horizontal (10)

Vertical (26)

Diagonal left down (2)

Diagonal right up (34)

LM (35)—when this mode is enabled for the chroma blocks.

FIG. 13c shows the intra mode numbering in the current HEVC specification, well known by the man skilled in the art.

In an additional embodiment, the diagonal left up mode (18) can be inserted into the set ModeSet.

When the change is normative, it involves changes in the decoding process. Therefore the HEVC specification has to be modified. The following syntax changes are made compared to the specification corresponding the HM7.0 (HEVC specification issued in June 2012). The syntax for the transform_unit function is the following. The changes compared to HM7.0 are highlighted in grey and bold font.

```
transform_unit( x0L, y0L, x0C, y0C, log2TrafoWidth, log2TrafoHeight, trafoDepth, blkIdx ) {        Descriptor
    ...
    if( cbf_luma[ x0L ][ y0L ][ trafoDepth ])
        residual_coding( x0L, y0L, log2TrafoWidth, log2TrafoHeight, scanIdx, 0, 1)
    useTS = (IntraPredModeC[   x0  ][   y0  ]  != 0   &&
             IntraPredModeC[   x0  ][   y0  ]  != 1   &&
             IntraPredModeC[   x0  ][   y0  ]  != 2   &&
             IntraPredModeC[   x0  ][   y0  ]  != 10  &&
             IntraPredModeC[ x0 ][ y0 ] != 26 &&
             IntraPredModeC[   x0  ][   y0  ]  != 34  &&
             IntraPredModeC[ x0 ][ y0 ] !=35 ) ? 0 :1
    if( log2TrafoSize > 2 ) (
        if( cbf_cb[ x0C ][ y0C ][ trafoDepth ])
            residual_coding( x0C, y0C, log2TrafoWidth − 1, log2TrafoHeight − 1, scanIdxC, 1, useTS )
        if( cbf_cr[ x0C ][ y0C ][ trafoDepth ])
            residual_coding( x0C, y0C, log2TrafoWidth − 1, log2TrafoHeight − 1, scanIdxC, 2, useTS )
    } else if( blkIdx = = 3 ) {
        if( cbf_cb[ x0C ][ y0C ][ trafoDepth ])
            residual_coding( x0C, y0C, log2TrafoWidth, log2TrafoHeight, scanIdxC, 1, useTS)
        if( cbf_cr[ x0C ][ y0C ][ trafoDepth ])
```

```
    residual_coding( x0C, y0C, log2TrafoWidth, log2TrafoHeight, scanIdxC, 2, useTS)
   }
  }
 }
}
```

Referring to the modified syntax of transform_unit(•), the following applies:
  useTS is set to 1 for the luma TU.
  useTS is then computed by checking if the intraPredModeC syntax element of the two chroma blocks (since the same prediction mode applies to both blocks) is not including in the set of authorized intra prediction mode values. The residual decoding of the two chroma blocks is then invoked with this value of useTS.

In an embodiment, the same principle can apply directly to the luma TU: depending on the intra prediction mode applied to the luma block, the ts_flag value is directly inferred for the luma TUs of this luma block. The set of modes ModeSet can be the only modes for which ts_flag has to be signaled (at the encoder and decoder sides), and evaluated at the encoder side by checking with or without transform skip.

In another embodiment, as a variation, the ts_flag for the chroma TUs is inferred from the value of the intra prediction of the luma block, and not of the chroma block. If the intra prediction mode of the luma block is among a set of authorized modes, then ts_flag has to be evaluated (at the encoder) and signaled (at the encoder and decoder sides) for the corresponding chromas TUs of the luma block.

The different embodiments presented in FIGS. 11a to 13b can be combined for improving the result. The FIGS. 14a to 15b illustrate two different kinds of implementation (both for the encoding and the decoding process) as further examples.

Figure 14A:
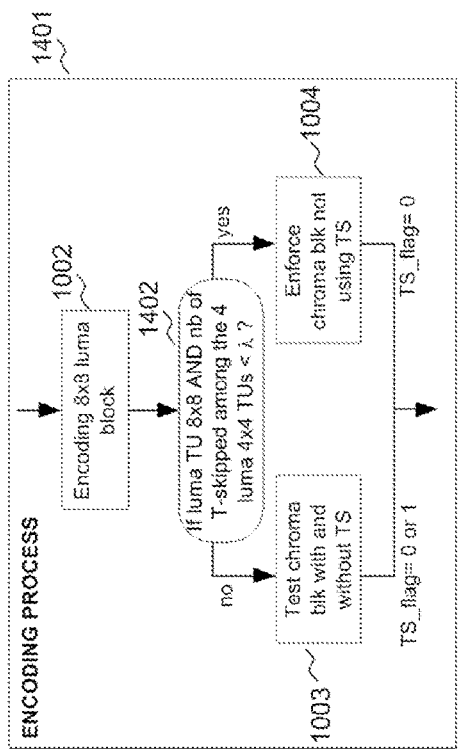
FIGS. 14a and 14b are flow charts of an implementation of a method of encoding and decoding according to another embodiment of the invention, resulting to a combination of the first and the second embodiments.

FIG. 14a shows the combination of the embodiment illustrated in the FIGS. 11a and 12a. The checking step, 1402 is the combined checking of luma TU 8×8, 1102 and of the number of skipped 4×4 luma TUs, 1202.

Figure 15A:
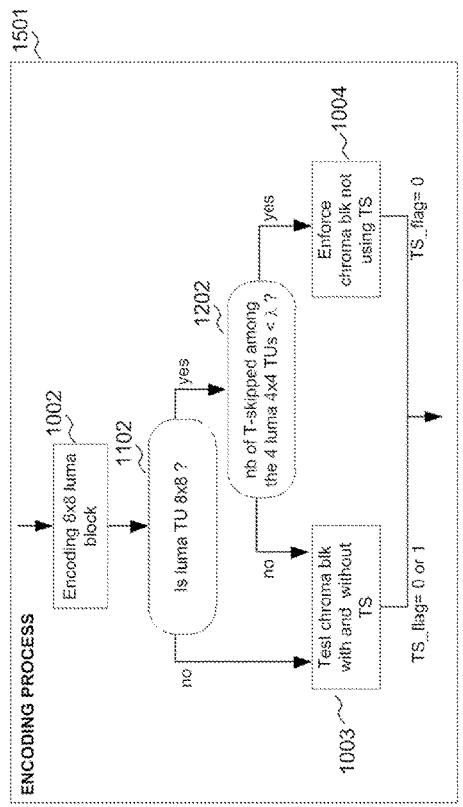
FIGS. 15a and 15b are flow charts of another implementation of a method of encoding and decoding according to another embodiment of the invention, resulting to a combination of the first and the second embodiments.

As illustrated in the FIG. 15a, the two checking steps 1102 and 1202 can be done sequentially.

In other words, the Luma TU must satisfy two predetermined conditions instead of only one in the previous embodiments.

Figure 14B:
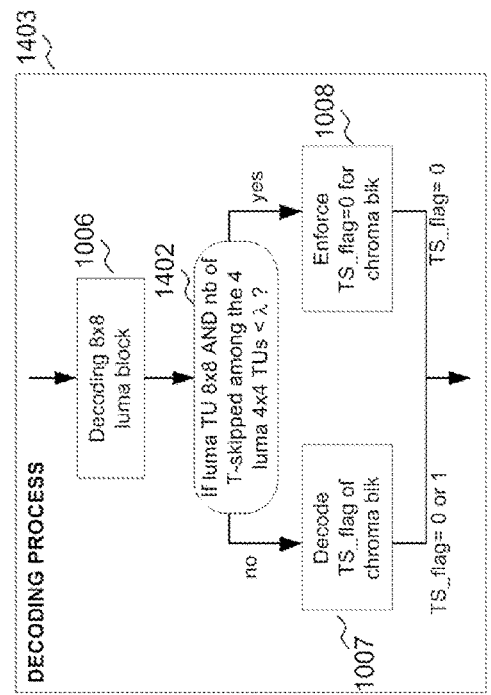
Figure 15B:
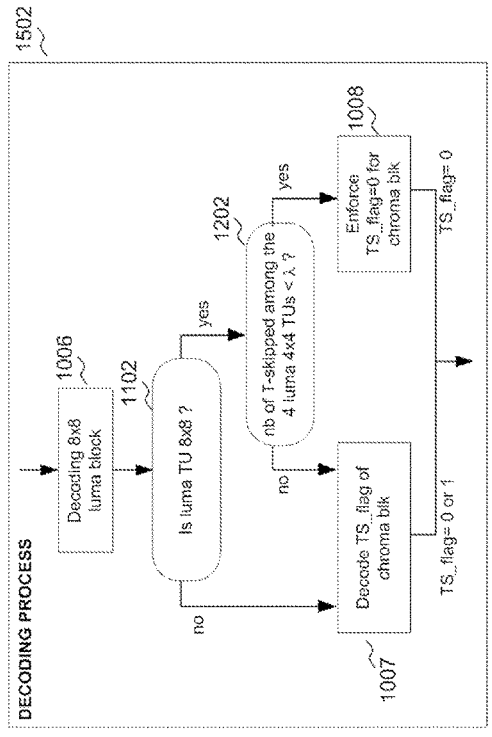

The FIGS. 14b and 15b respectively represent the corresponding decoding methods to the encoding methods represented in FIGS. 14a and 15a. The steps have already been described previously.

Of course, these examples are not limitative. For instance, the embodiment illustrated in the FIG. 12a can be combined with the one represented in FIG. 13a, in the same way.

The invention claimed is:

1. A method of encoding a video signal having at least a first signal component corresponding to a first color component, and a second signal component, associated with the first signal component and corresponding to a second color component, each said signal component being divided into blocks, and each said block having one or more encodable units, and the encoding of at least one encodable unit of said second signal component being switchable between first and second modes, the encoding in the first mode including a transforming step for transforming an encodable unit into coefficients, and the encoding in the second mode excluding the transforming step, the method comprising:

excluding, for at least one said encodable unit of said second signal component, use of said second mode for the encoding of the second-signal-component encodable unit concerned when the following condition is satisfied: the first-signal-component block corresponding to the second-signal-component encodable unit concerned is a sub-divided block having at least two encodable units, and the second mode is not used for encoding any of the encodable units of the sub-divided first-signal-component block; and when the condition is not satisfied, enabling a choice of which of the first and second encoding modes to use for the encoding of the second-signal-component encodable unit concerned.

2. The method according to claim 1, wherein when the use of the second mode is not excluded, selecting which of the first and second encoding modes to use for the encoding of the second-signal-component encodable unit concerned based on a predetermined criterion.

3. The method according to claim 1, wherein the first signal component is a Luma signal component and the second signal component is a Chroma signal component.

4. The method according to claim 1, wherein the first signal component is a Chroma signal component and the second signal component is a Luma signal component.

5. The method according to claim 1, wherein the or each said encodable unit is a transform unit.

6. The method according to claim 1, wherein the first mode is the Normal HEVC mode and the second mode is the Transform Skip HEVC mode.

7. The method according to claim 1, wherein the video signal represents a prediction residual.

8. The method according to claim 1, further comprising:
  transmitting to a decoder a flag for each said second-signal-component encodable unit for which said second mode was not excluded, which flag is usable by a decoder to determine which of the first and second modes was used to encode the encodable unit concerned, no such flag being transmitted to the decoder for each said second-signal-component encodable unit for which said second mode was excluded.

9. A method of decoding coefficients of a video signal, the video signal having at least a first signal component, corresponding to a first color component, and a second signal component, associated with the first signal component and corresponding to a second color component, each said signal component being divided into blocks comprising at least one coefficient, and each block having one or more decodable units, and the decoding of at least one decodable unit of the second signal component being switchable between first and second modes, the decoding in the first mode including an inverse transforming step for transforming coefficients into decodable units and the decoding in the second mode excluding the inverse transforming step, the method comprising:

excluding, for at least one decodable unit of the second signal component, the use of said second mode for the decoding of the decodable unit concerned when the following condition is satisfied: the first-signal-component block corresponding to the second-signal-component decodable unit concerned is a sub-divided block having at least two decodable units and the second mode is not used for decoding any of the decodable units of the sub-divided first-signal-component block; and when the condition is not satisfied, enabling a choice of which of the first and second decoding modes to use for the decoding of the second-signal-component decodable unit concerned.

10. The method according to claim 9, further comprising, in the event that the condition is satisfied, generating a flag having a predetermined value indicating that an encoder of the video signal did not use said second mode.

11. The method according to claim 9, further comprising:
when the use of the second mode is not excluded, employing a flag received from an encoder to decide which of the first and second encoding modes to use for the decoding of the second-signal-component decodable unit concerned.

12. The method according to claim 9, wherein the first signal component is a Luma signal component and the second signal component is a Chroma signal component.

13. The method according to claim 9, wherein the first signal component is a Chroma signal component and the second signal component is a Luma signal component.

14. The method according to claim 9, wherein the or each said decodable unit is a transform unit.

15. The method according to claim 9, wherein the first mode is the Normal HEVC mode and the second mode is the Transform Skip HEVC mode.

16. The method according to claim 9, wherein the video signal represents a prediction residual.

17. An encoder for encoding a video signal having at least a first signal component, corresponding to a first color component, and a second signal component associated with the first signal component and corresponding to a second color component, each said signal component being divided into blocks, and each said block having one or more encodable units, and the encoding of at least one encodable unit of said second signal component being switchable between first and second modes, the encoding in the first mode including transforming an encodable unit into coefficients, and the encoding in the second mode excluding said transforming of an encodable unit into coefficients, the encoder comprising:
an excluding unit which excludes means for excluding, for at least one said encodable unit of said second signal component, use of said second mode for the encoding of the second-signal-component encodable unit concerned when the following condition is satisfied: the first-signal-component block corresponding to the second-signal-component encodable unit concerned is a sub-divided block having at least two encodable units, and the second mode is not used for encoding any of the encodable units of the sub-divided first-signal-component block; and
an enabling unit which enables a choice of which of the first and second encoding modes to use for the encoding of the second-signal-component encodable unit concerned when the condition is not satisfied.

18. A decoder for decoding coefficients of a video signal, the video signal having at least a first signal component, corresponding to a first color component, and a second signal component, associated with the first signal component and corresponding to a second color component, each said signal component being divided into blocks comprising at least one coefficient, and each block having one or more decodable units, and the decoder being configured so that the decoding of at least one decodable unit of the second signal component is switchable between first and second modes, the decoding in the first mode including inverse transforming, and the decoding in the second mode excluding said inverse transforming, the decoder comprising:
an excluding unit which excludes, means for excluding for at least one said decodable unit of said second signal component, use of said second mode for the encoding of the second-signal-component decodable unit concerned when the following condition is satisfied: the first-signal-component block corresponding to the second-signal-component decodable unit concerned is a sub-divided block having at least two decodable units and the second mode is not used for decoding any of the decodable units of the sub-divided first-signal-component block;
an enabling unit which enables a choice of which of the first and second decoding modes to use for the decoding of the second-signal-component decodable unit concerned when the condition is not satisfied; and
a generating unit which generates a flag having a predetermined value indicating that an encoder did not use said second mode, in the event that the condition is satisfied.

19. A non-transitory computer-readable storage medium storing a program which, when executed by a computer or processor, causes the computer or processor to carry out a method of encoding a video signal, the video signal having at least a first signal component corresponding to a first color component, and a second signal component, associated with the first signal component and corresponding to a second color component, each said signal component being divided into blocks, and each said block having one or more encodable units, and the encoding of at least one encodable unit of said second signal component being switchable between first and second modes, the encoding in the first mode including a transforming step for transforming an encodable unit into coefficients, and the encoding in the second mode excluding the transforming step, the program comprising:
a code portion which excludes, for at least one said encodable unit of said second signal component, use of said second mode for the encoding of the second-signal-component encodable unit concerned when the following condition is satisfied: the first-signal-component block corresponding to the second-signal-component encodable unit concerned is a sub-divided block having at least two encodable units, and the second mode is not used for encoding any of the encodable units of the sub-divided first-signal-component block; and
a code portion which enables a choice of which of the first and second encoding modes to use for the encoding of the second-signal-component encodable unit concerned when the condition is not satisfied.

20. A non-transitory computer-readable storage medium storing a program which, when executed by computer or processor, causes the computer or processor to carry out a method of decoding coefficients of a video signal, the video signal having at least a first signal component, corresponding to a first color component, and a second signal component, associated with the first signal component and corresponding to a second color component, each said signal component being divided into blocks comprising at least one coefficient, and each block having one or more decodable units, and the decoding of at least one decodable unit of the second signal component being switchable between first and second modes, the decoding in the first mode including an inverse transforming step for transforming step for transforming coefficients into decodable units and the decoding in the second mode excluding the inverse transforming step, the program comprising:
- a code portion which excludes, for at least one decodable unit of the second signal component, the use of said second mode for the decoding of the decodable unit concerned when the following condition is satisfied: the first-signal-component block corresponding to the second-signal-component decodable unit concerned is a sub-divided block having at least two decodable units and the second mode is not used for decoding any of the decodable units of the sub-divided first-signal-component block; and
- a code portion which enables a choice of which of the first and second decoding modes to use for the decoding of the second-signal-component decodable unit concerned when the condition is not satisfied.

21. A method of encoding a video signal having at least a first signal component corresponding to a first color component, and a second signal component, associated with the first signal component and corresponding to a second color component, each said signal component being divided into blocks, and each said block having one or more encodable units, and the encoding of at least one encodable unit of said second signal component being switchable between first and second modes, the encoding in the first mode including a transforming step for transforming an encodable unit into coefficients, and the encoding in the second mode excluding the transforming step, the method comprising:
- excluding, for at least one said encodable unit of said second signal component, use of said second mode for the encoding of the second-signal-component encodable unit concerned when the following condition is satisfied: the first-signal-component block corresponding to the second-signal-component encodable unit concerned comprises only one encodable unit; and
- when the condition is not satisfied, enabling a choice of which of the first and second encoding modes to use for the encoding of the second-signal-component encodable unit concerned.

22. A method according to claim 21, wherein the second-signal-component encodable unit concerned is a 4×4 encodable unit and the first-signal-component block corresponding thereto is an 8×8 block.

23. The method according to claim 21, further comprising:
- when the use of the second mode is not excluded, selecting which of the first and second encoding modes to use for the encoding of the second-signal-component encodable unit concerned based on a predetermined criterion.

24. The method according to claim 21, wherein the first signal component is a Luma signal component and the second signal component is a Chroma signal component.

25. The method according to claim 21, wherein the first signal component is a Chroma signal component and the second signal component is a Luma signal component.

26. The method according to claim 21, wherein the or each said encodable unit is a transform unit.

27. The method according to claim 21, wherein the first mode is the Normal HEVC mode and the second mode is the Transform Skip HEVC mode.

28. The method according to claim 21, wherein the video signal represents a prediction residual.

29. The method according to claim 21, further comprising:
- transmitting to a decoder a flag for each said second-signal-component encodable unit for which said second mode was not excluded, which flag is usable by a decoder to determine which of the first and second modes was used to encode the encodable unit concerned, no such flag being transmitted to the decoder for each said second-signal-component encodable unit for which said second mode was excluded.

30. A method of decoding coefficients of a video signal, the video signal having at least a first signal component, corresponding to a first color component, and a second signal component, associated with the first signal component and corresponding to a second color component, each said signal component being divided into blocks comprising at least one coefficient, and each block having one or more decodable units, and the decoding of at least one decodable unit of the second signal component being switchable between first and second modes, the decoding in the first mode including an inverse transforming step for transforming coefficients into decodable units and the decoding in the second mode excluding the inverse transforming step, the method comprising:
- excluding, for at least one decodable unit of the second signal component, the use of said second mode for the decoding of the decodable unit concerned when the following condition is satisfied: the first-signal-component block corresponding to the second-signal-component decodable unit concerned comprises only one decodable unit; and
- when the condition is not satisfied, enabling a choice of which of the first and second decoding modes to use for the encoding of the second-signal-component decodable unit concerned.

31. The method according to claim 30, further comprising, in the event that the condition is satisfied, generating a flag having a predetermined value indicating that an encoder of the video signal did not use said second mode.

32. A method according to claim 30, wherein the second-signal-component decodable unit concerned is a 4×4 decodable unit and the first-signal-component block corresponding thereto is an 8×8 block.

33. The method according to claim 30, further comprising:
- when the use of the second mode is not excluded, employing a flag received from an encoder to decide which of the first and second encoding modes to use for the decoding of the second-signal-component decodable unit concerned.

34. The method according to claim 30, wherein the first signal component is a Luma signal component and the second signal component is a Chroma signal component.

35. The method according to claim 30, wherein the first signal component is a Chroma signal component and the second signal component is a Luma signal component.

36. The method according to claim 30, wherein the or each said decodable unit is a transform unit.

37. The method according to claim 30, wherein the first mode is the Normal HEVC mode and the second mode is the Transform Skip HEVC mode.

38. The method according to claim 30, wherein the video signal represents a prediction residual.

39. An encoder for encoding a video signal having at least a first signal component, corresponding to a first color component, and a second signal component associated with the first signal component and corresponding to a second color component, each said signal component being divided into blocks, and each said block having one or more encodable units, and the encoding of at least one encodable unit of said second signal component being switchable between first and second modes, the encoding in the first mode including transforming an encodable unit into coefficients, and the encoding in the second mode excluding said transforming of an encodable unit into coefficients the encoder comprising:
- an excluding unit which excludes, for at least one said encodable unit of said second signal component, use of said second mode for the encoding of the second-signal-component encodable unit concerned when the following condition is satisfied: the first-signal-component block corresponding to the second-signal-component encodable unit concerned comprises only one encodable unit; and
- an enabling unit which enables a choice of which of the first and second encoding modes to use for the encoding of the second-signal-component encodable unit concerned when the condition is not satisfied.

40. An encoder according to claim 39, wherein the second-signal-component encodable unit concerned is a 4×4 encodable unit and the first-signal-component block corresponding thereto is an 8×8 block.

41. A decoder for decoding coefficients of a video signal, the video signal having at least a first signal component, corresponding to a first color component, and a second signal component, associated with the first signal component and corresponding to a second color component, each said signal component being divided into blocks comprising at least one coefficient, and each block having one or more decodable units, and the decoder being configured so that the decoding of at least one decodable unit of the second signal component is switchable between first and second modes, the decoding in the first mode including inverse transforming, and the decoding in the second mode excluding said inverse transforming, the decoder comprising:
- an excluding unit which excludes, for at least one said decodable unit of said second signal component, use of said second mode for the decoding of the second-signal-component decodable unit concerned when the following condition is satisfied: the first-signal-component block corresponding to the second-signal-component decodable unit concerned comprises only one decodable unit;
- an enabling unit which enables a choice of which of the first and second decoding modes to use for the decoding of the second-signal-component decodable unit concerned when the condition is not satisfied; and
- a generating unit which generates a flag having a predetermined value indicating that an encoder did not use said second mode, in the event that the condition is satisfied.

42. A decoder according to claim 41, wherein the second-signal-component decodable unit concerned is a 4×4 decodable unit and the first-signal-component block corresponding thereto is an 8×8 block.

43. A non-transitory computer-readable storage medium storing a program which, when executed by a computer or processor, causes the computer or processor to carry out a method of encoding a video signal, the video signal having at least a first signal component corresponding to a first color component, and a second signal component, associated with the first signal component and corresponding to a second color component, each said signal component being divided into blocks, and each said block having one or more encodable units, and the encoding of at least one encodable unit of said second signal component being switchable between first and second modes, the encoding in the first mode including a transforming step for transforming an encodable unit into coefficients, and the encoding in the second mode excluding the transforming step, the program comprising:
- a code portion which excludes, for at least one said encodable unit of said second signal component, use of said second mode for the encoding of the second-signal-component encodable unit concerned when the following condition is satisfied: the first-signal-component block corresponding to the second-signal-component encodable unit concerned comprises only one encodable unit; and
- a code portion which enables a choice of which of the first and second encoding modes to use for the encoding of the second-signal-component encodable unit concerned when the condition is not satisfied.

44. A non-transitory computer-readable storage medium storing a program which, when executed by computer or processor, causes the computer or processor to carry out a method of decoding coefficients of a video signal, the video signal having at least a first signal component, corresponding to a first color component, and a second signal component, associated with the first signal component and corresponding to a second color component, each said signal component being divided into blocks comprising at least one coefficient, and each block having one or more decodable units, and the decoding of at least one decodable unit of the second signal component being switchable between first and second modes, the decoding in the first mode including an inverse transforming step for transforming coefficients into decodable units and the decoding in the second mode excluding the inverse transforming step, the program comprising:
- a code portion which excludes, for at least one decodable unit of the second signal component, the use of said second mode for the decoding of the decodable unit concerned when the following condition is satisfied: the first-signal-component block corresponding to the second-signal-component decodable unit concerned comprises only one decodable unit; and
- a code portion which enables a choice of which of the first and second decoding modes to use for the decoding of the second-signal-component decodable unit concerned when the condition is not satisfied.

* * * * *